(12) United States Patent
Campbell et al.

(10) Patent No.: US 10,640,608 B2
(45) Date of Patent: May 5, 2020

(54) PHOSPHORUS-CONTAINING CAPROLACTONE MONOMERS FOR SYNTHESIS OF FLAME RETARDANT POLYCAPROLACTONES

(71) Applicant: International Business Machines Corporation, Armonk, NY (US)

(72) Inventors: Eric J. Campbell, Rochester, MN (US); Sarah K. Czaplewski, Rochester, MN (US); Brandon M. Kobilka, Tucson, AZ (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/393,568

(22) Filed: Apr. 24, 2019

(65) Prior Publication Data
US 2019/0248955 A1    Aug. 15, 2019

Related U.S. Application Data

(62) Division of application No. 15/480,785, filed on Apr. 6, 2017, now Pat. No. 10,336,861.

(51) Int. Cl.
| | | |
|---|---|---|
| *C08G 63/692* | (2006.01) | |
| *C08G 63/78* | (2006.01) | |
| *C08L 67/04* | (2006.01) | |
| *C08L 67/00* | (2006.01) | |
| *C09K 21/12* | (2006.01) | |
| *C09K 21/14* | (2006.01) | |
| *C08G 63/91* | (2006.01) | |

(52) U.S. Cl.
CPC ......... *C08G 63/6922* (2013.01); *C08G 63/78* (2013.01); *C08G 63/912* (2013.01)

(58) Field of Classification Search
CPC .... C08G 63/6922; C08G 63/78; C08G 63/08; C08L 67/04; C08L 33/68; C08L 33/66; C08L 67/00; C09K 21/12; C09K 21/14
USPC ......................................................... 526/75
See application file for complete search history.

(56) References Cited

U.S. PATENT DOCUMENTS

| | | |
|---|---|---|
| 8,592,539 B2 | 11/2013 | Tang et al. |
| 9,187,597 B1 | 11/2015 | Boday et al. |
| 2002/0155092 A1 | 10/2002 | Leong et al. |
| 2007/0066748 A1 | 3/2007 | Lewandowski et al. |
| 2016/0046761 A1 | 2/2016 | Hegmann et al. |
| 2017/0029616 A1 | 2/2017 | Boday et al. |

FOREIGN PATENT DOCUMENTS

EP    1188761 A1    3/2002

OTHER PUBLICATIONS

Park et al., "Preparation and physical properties of polyurethane flame retardant coatings using phosphorus-containing lactone modified polyesters", (J. Coatings Technology, Dec. 1999, v.71, i.899, pp. 59-65). (Year: 1999).*
STIC Search—Feb. 3, 2019 (Year: 2019).*
Kroner et al., "The Gas-Phase Acidity of 2(3H)-Oxepinone: A Step toward an Experimental Heat of Formation for the 2-Oxepinoxy Radical," Journal of the American Chemical Society, 2005, vol. 127, No. 20, pp. 7466-7473. DOI: 10.1021/0050173u.
Lou et al., "Living Ring-Opening (Co)polymerization of 6,7-Dihydro-2(5H)-oxepinone into Unsaturated Aliphatic Polyesters," Macromolecules 2001, 34, pp. 5806-5811.
Park et al., "Preparation and Physical Properties of Polyurethane Flame Retardant Coatings Using Phosphorus-Containing Lactone Modified Polyesters," Journal of Coatings Technology, Dec. 1999, vol. 71, No. 899, pp. 59-65. DOI: 10.1007/BF02697979.
Zhang et al., "Synthesis of well-defined carboxyl poly($\varepsilon$-caprolactone) by fine-tuning the protection group," Polymer chemistry, 2016, 9 pages, The Royal Society of Chemistry. DOI: 10.1039/c6py00932h.
Gilman, J., "Chapter 3: Flame Retardant Mechanism of Polymer-Clay Nanocomposites," Flame Retardant Polymer Nanocomposites, Section 3.1.1, pp. 68-69, 2007, John Wiley & Sons, Inc. (Eds. Morgan et al.) https://books.google.com/books?id=LAmOb4p8IwIC&pg=PA68&lpg=PA68&dq=polycaprolactone+flame+retardant&source=bl&ots=iWPMcOmIZB&sig=UZhr1GP0I_OMPXVCRc9vSo7LhGg&hl=en&sa=X&ved=0ahUKEwie11P_6PQAhXCLSYKHXWkAyEQ6AEITjAE#v=onepage&q=polycaprolactone%20flame%20retardant&f=false.
STIC Search—Feb. 3, 2019 (Year: 2019) from U.S. Appl. No. 15/480,785, filed Nov. 1, 2017, 48 pages.
Campbell et al., "Flame Retardant Polycaprolactone," U.S. Appl. No. 15/589,998, filed May 8, 2017.
Campbell et al., "Flame Retardant Polycaprolactone," U.S. Appl. No. 16/393,499, filed Apr. 24, 2019.
Campbell et al., "Phosphorus-Containing Caprolactone Monomers for Synthesis of Flame Retardant Polycaprolactones," U.S. Appl. No. 15/480785, filed Apr. 6, 2017.
List of IBM Patents or Patent Applications Treated as Related, Signed Apr. 24, 2019, 2 pages.

* cited by examiner

*Primary Examiner* — Ling Siu Choi
*Assistant Examiner* — Ronald Grinsted
(74) *Attorney, Agent, or Firm* — Kelsey M. Skodje

(57) ABSTRACT

A process of forming a flame retardant polycaprolactone includes utilizing a caprolactone molecule to form a hydroxyl-functionalized caprolactone molecule. The process also includes chemically reacting the hydroxyl-functionalized caprolactone molecule with a phosphorus-containing flame retardant molecule to form a flame retardant-functionalized caprolactone monomer. The process further includes polymerizing a mixture that includes at least the flame retardant-functionalized caprolactone monomer to form a flame retardant polycaprolactone.

14 Claims, 18 Drawing Sheets

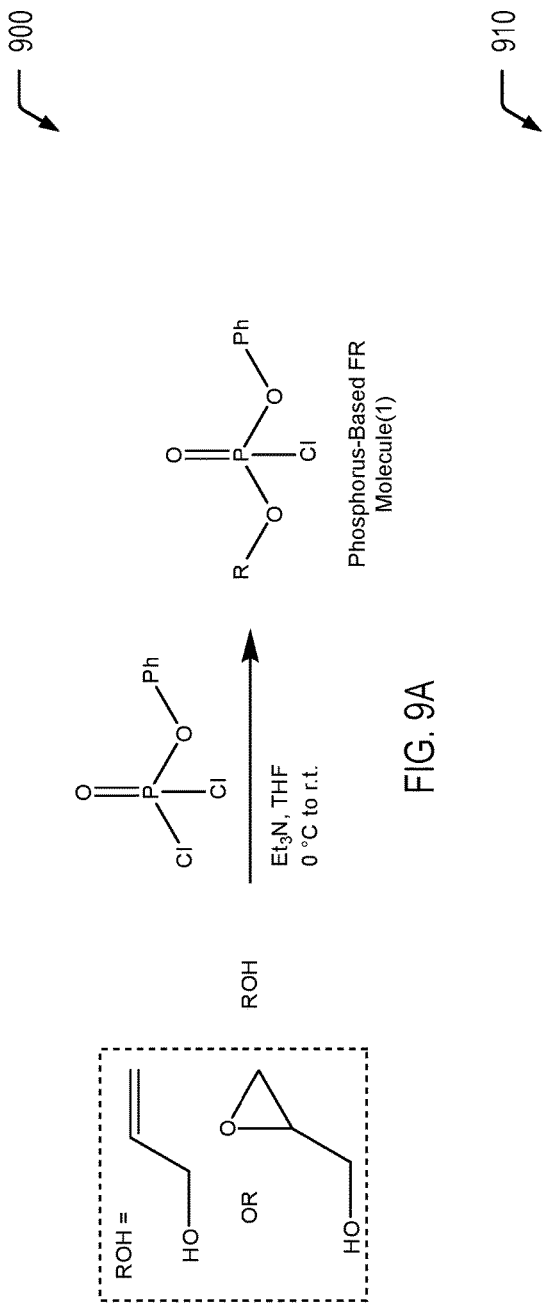
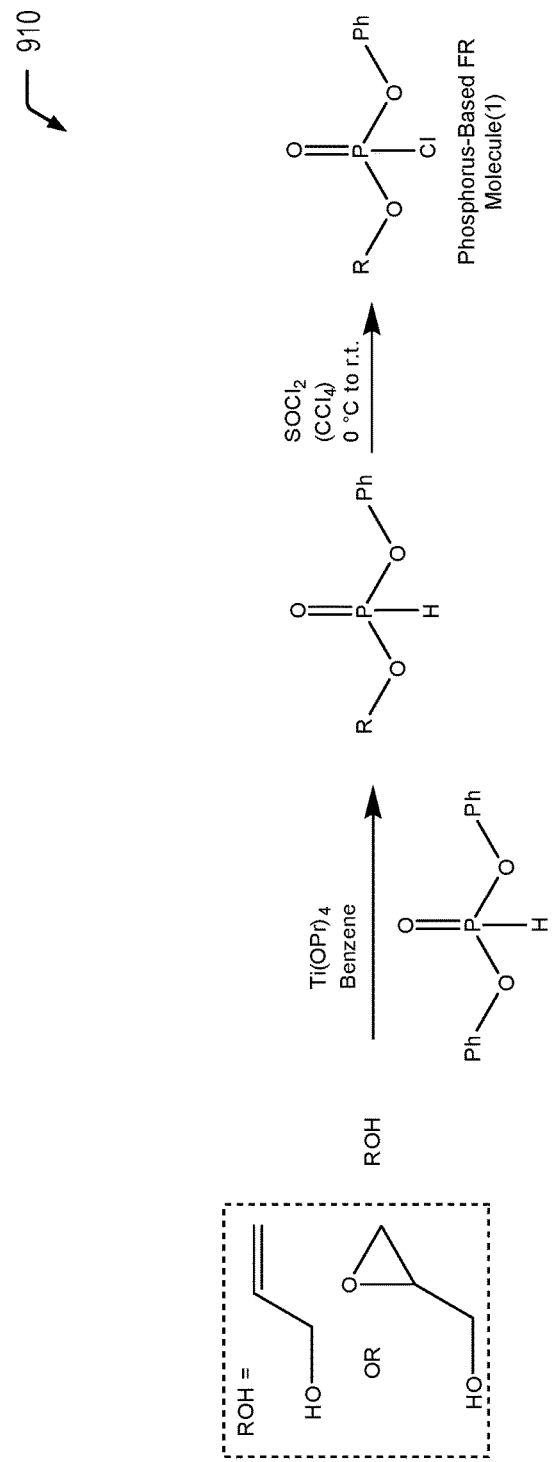
FIG. 9A
FIG. 9B

PHOSPHORUS-CONTAINING CAPROLACTONE MONOMERS FOR SYNTHESIS OF FLAME RETARDANT POLYCAPROLACTONES

BACKGROUND

Plastics are typically derived from a finite and dwindling supply of petrochemicals, resulting in price fluctuations and supply chain instability. Replacing non-renewable petroleum-based polymers with polymers derived from renewable resources may be desirable. However, there may be limited alternatives to petroleum-based polymers in certain contexts. To illustrate, particular plastics performance standards may be specified by a standards body or by a regulatory agency. In some cases, alternatives to petroleum-based polymers may be limited as a result of challenges associated with satisfying particular plastics performance standards.

SUMMARY

In a particular embodiment, a process of forming a flame retardant polycaprolactone is disclosed. The process includes utilizing a caprolactone molecule to form a hydroxyl-functionalized caprolactone molecule. The process also includes chemically reacting the hydroxyl-functionalized caprolactone molecule with a phosphorus-containing flame retardant molecule to form a flame retardant-functionalized caprolactone monomer. The process further includes polymerizing a mixture that includes at least the flame retardant-functionalized caprolactone monomer to form a flame retardant polycaprolactone.

In another embodiment, a flame retardant polycaprolactone is disclosed. The flame retardant polycaprolactone is formed according to a process that includes utilizing a caprolactone molecule to form a hydroxyl-functionalized caprolactone molecule. The process also includes chemically reacting the hydroxyl-functionalized caprolactone molecule with a phosphorus-containing flame retardant molecule to form a flame retardant-functionalized caprolactone monomer. The phosphorus-containing flame retardant molecule includes an allyl group, an epoxide group, or a furan group. The process further includes polymerizing a mixture that includes at least the flame retardant-functionalized caprolactone monomer to form a flame retardant polycaprolactone.

In yet another embodiment, a process of forming a flame retardant polycaprolactone is disclosed. The process includes utilizing a caprolactone molecule to form a hydroxyl-functionalized caprolactone molecule. The process also includes chemically reacting the hydroxyl-functionalized caprolactone molecule with a phosphorus-containing flame retardant molecule that includes an allyl group to form a flame retardant-functionalized caprolactone molecule that includes the allyl group. The process further includes chemically reacting the allyl group of the flame retardant-functionalized caprolactone molecule with a thiol to form a flame retardant-functionalized caprolactone monomer that includes a cross-linking moiety. The process also includes polymerizing a mixture that includes at least the flame retardant-functionalized caprolactone monomer to form a flame retardant polycaprolactone.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIGS. 9A and 9B are chemical reaction diagrams showing alternative embodiments of processes of forming a first phosphorus-based FR molecule for forming a FR-functionalized caprolactone molecule.

DETAILED DESCRIPTION

The present disclosure describes phosphorus-containing caprolactone monomers and flame retardant (FR) polycaprolactones formed from the phosphorus-containing caprolactone monomers. The flame retardant functionalized (FR-functionalized) caprolactone monomers of the present disclosure may be formed from one or more phosphorus-based FR molecules that include at least one phosphorus moiety to impart flame retardancy characteristics and at least one cross-linking moiety (e.g., for subsequent cross-linking of the FR polycaprolactones into a variety of different polymeric materials). Examples of cross-linking moieties include allyl groups, epoxide groups, and furan groups. In some cases, thiol-ene "Click" chemistry may be used to convert the allyl group(s) to hydroxyl, amine, carboxylic acid, or ester cross-linker(s). In the case of furans, the furan moieties represent diene groups that may be used for (reversibly) cross-linking the FR polycaprolactones of the present disclosure to a renewable/non-renewable polymeric material.

Figure 1:
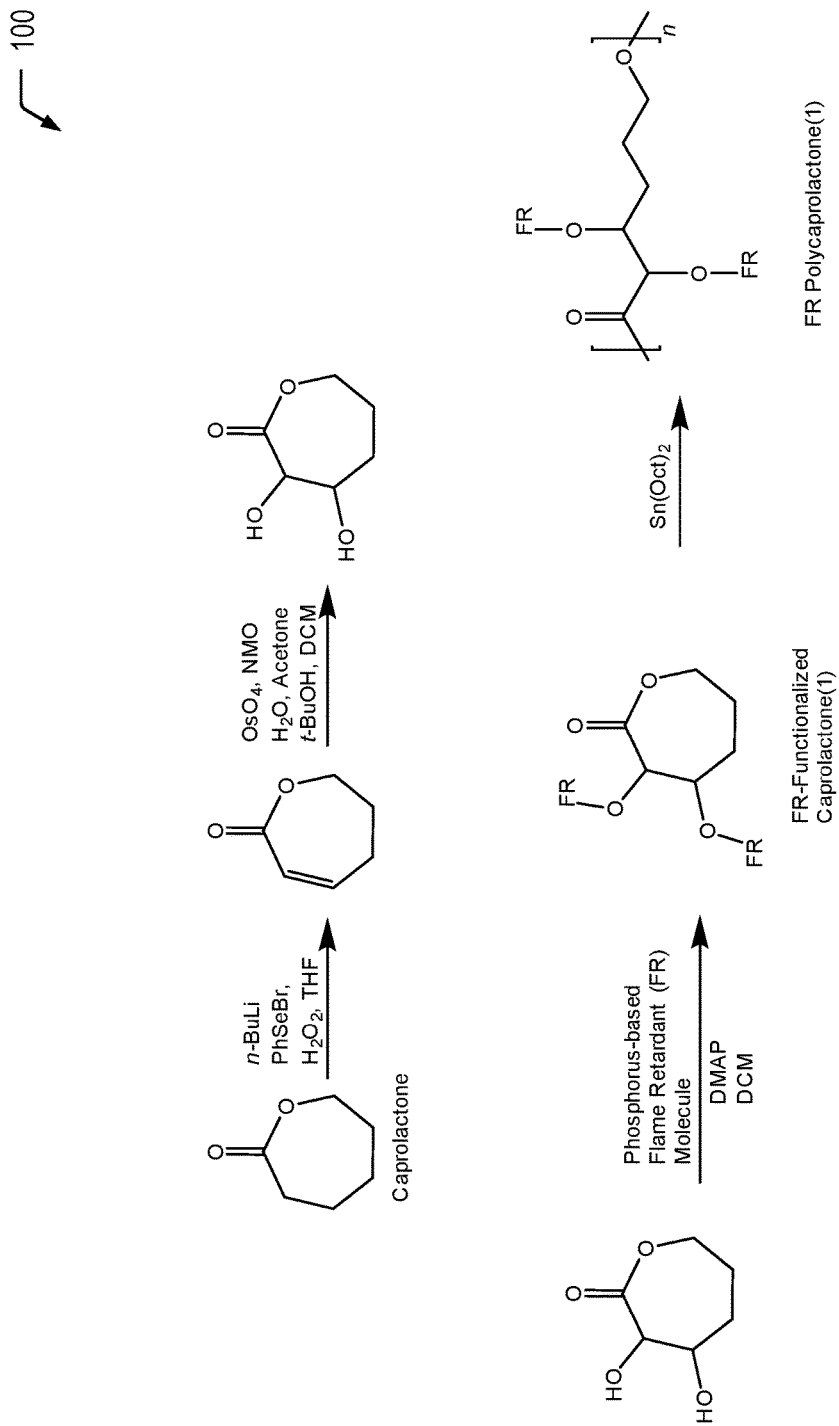
FIG. 1 is a chemical reaction diagram showing a process of forming a first flame retardant (FR)-functionalized caprolactone molecule using a phosphorus-based FR molecule and polymerizing the first FR-functionalized caprolactone molecule to form a first FR polycaprolactone, according to one embodiment.

Referring to FIG. 1, a chemical reaction diagram 100 illustrates a process of forming a first FR-functionalized caprolactone molecule using a phosphorus-based FR molecule and polymerizing the first FR-functionalized caprolactone molecule to form a first FR polycaprolactone, according to one embodiment. As further described herein, the phosphorus-based FR molecule may correspond to one of the phosphorus-based FR molecules synthesized according to one of the processes described herein with respect to FIGS. 9A/9B, 11A/B, 13, 14A/14B, 15A/B, and 16A/B. As further described herein, the phosphorus-based FR molecules that may be utilized to impart flame retardancy characteristics to a caprolactone molecule may also include one or more cross-linking groups.

FIG. 1 illustrates that the first FR-functionalized caprolactone molecule may be synthesized from a caprolactone molecule via a diol intermediate. In the first chemical reaction depicted at the top of FIG. 1, a carbon-carbon double bond is added to the caprolactone molecule to form an intermediate molecule. The second chemical reaction illustrates that a 2,3-hydroxyl-caprolactone molecule may be synthesized from the intermediate molecule via an Upjohn dihydroxylation involving catalytic osmium tetroxide.

In the third chemical reaction (depicted at the bottom of FIG. 1), the hydroxyl groups of the 2,3-hydroxyl-caprolactone molecule are functionalized with one of the phosphorus-based flame retardant molecules described herein with catalytic dimethylaminopyridine (DMAP) to form the first FR-functionalized caprolactone molecule. The fourth chemical reaction illustrates that the first FR-functionalized caprolactone molecule is then polymerized using catalytic tin(II) octanoate to form a first FR polycaprolactone (with cross-linkers, not shown in FIG. 1).

As a prophetic example, referring to the first chemical reaction depicted at the top of FIG. 1, one equivalent of n-Butyllithium (n-BuLi) may be added dropwise to anhydrous tetrahydrofuran (THF) and diisopropylamine (1.2 equiv.) in dry THF under nitrogen at −78° C. for 15 minutes. ε-Caprolactone (1 equiv.) in dry THF may be added dropwise, and the solution may be stirred at −78° C. for 15 minutes. One equivalent of phenylselenenyl bromide (Ph-SeBr) in dry THF may be added rapidly between −78° C. and −60° C., and the solution may be stirred at −78° C. for 15 min. Water (20 mL) may be added, and the THF may be evaporated in vacuo. The resulting residue may be extracted with diethyl ether (4x). The combined organic solvents may be washed with water (4x), dried ($MgSO_4$), filtered, and evaporated in vacuo. The residue in ether may be kept at −20° C. overnight to give the phenylselenenyl lactone (14.1 g) as crystals. The mother liquors may be chromatographed on silica gel, eluting with dichloromethane to give more phenylselenenyl lactone. Hydrogen peroxide (30%, 1.3 equiv.) may be added dropwise with stirring to the phenylselenenyl lactone (1 equiv.) in THF at 25° C. After the addition is complete, the temperature may be maintained between 30° C. and 33° C. for 2.5 hours. The resulting solution may be evaporated in vacuo, and the residue may be chromatographed on silica gel, eluting with ether-light petroleum (bp: 30-40° C.) (1:1) to give the "caprolactone-diene" product depicted on the right side of the chemical reaction arrow, which may be further purified by distillation.

As a prophetic example, referring to the second chemical reaction depicted at the top of FIG. 1, to a stirred solution of the "caprolactone-diene" (1 equiv.) in a solution of acetone/water (8:1) may be added (2 equiv.) N-Methylmorpholine N-oxide (NMO) and a 2.5% solution of osmium tetroxide ($OsO_4$) in tert-butanol (t-BuOH) (5 mol % of $OSO_4$), and the mixture may be stirred overnight at room temperature. The reaction may be quenched with a saturated solution of $Na_2S_2O_3$, and may be stirred for one hour and transferred in a separation funnel. The aqueous layer may be extracted with ethyl acetate, the combined organic layers dried over $Na_2SO_4$ and the solvent removed under reduced pressure. The crude product may be purified by recrystallization or column chromatography.

As a prophetic example, referring to the third chemical reaction depicted at the bottom of FIG. 1, to a solution of the "dihydroxycaprolactone" (1 equiv.) and a phosphorus-based FR molecule (>2 equiv.), such as diphenyl chlorophosphate, in anhydrous dichloromethane (DCM) or THF at 0° C., may be added a solution of trimethylamine ($NEt_3$) and/DMAP (>2 equiv.) in anhydrous DCM or THF, dropwise. The reaction may be heated to reflux and stirred for up to 24 hours. The reaction may be poured into a saturated solution of ammonium chloride and stirred for one hour and transferred in a separation funnel. The aqueous layer may be extracted with ethyl acetate, the combined organic layers dried over $Na_2SO_4$, and the solvent removed under reduced pressure. The crude product may be purified by recrystallization or column chromatography.

As a prophetic example, referring to the fourth chemical reaction depicted at the bottom of FIG. 1, the FR-functionalized caprolactone and a catalyst such as tin (II) octanoate, Sn(Oct)$_2$ (0.1-1 mol %), may be added to a reaction vessel, which may contain a solvent such as DCM. After a period of up to 24 hours, the melt or solution may be added directly to hexanes or methanol, dropwise or all in one portion, to precipitate the polymer, which may be collected by filtration and dried in a vacuum oven at >60° C. until complete removal of volatiles (determined by thermogravimetric analysis).

Thus, FIG. 1 illustrates an example of a process of forming a first FR-functionalized caprolactone molecule using a phosphorus-based FR molecule and polymerizing the first FR-functionalized caprolactone molecule to form a first FR polycaprolactone. As further described herein, the phosphorus-based molecule that is used to form the first FR-functionalized caprolactone molecule may also include one or more cross-linking functional groups for subsequent cross-linking of the first FR polycaprolactone.

Figure 2:
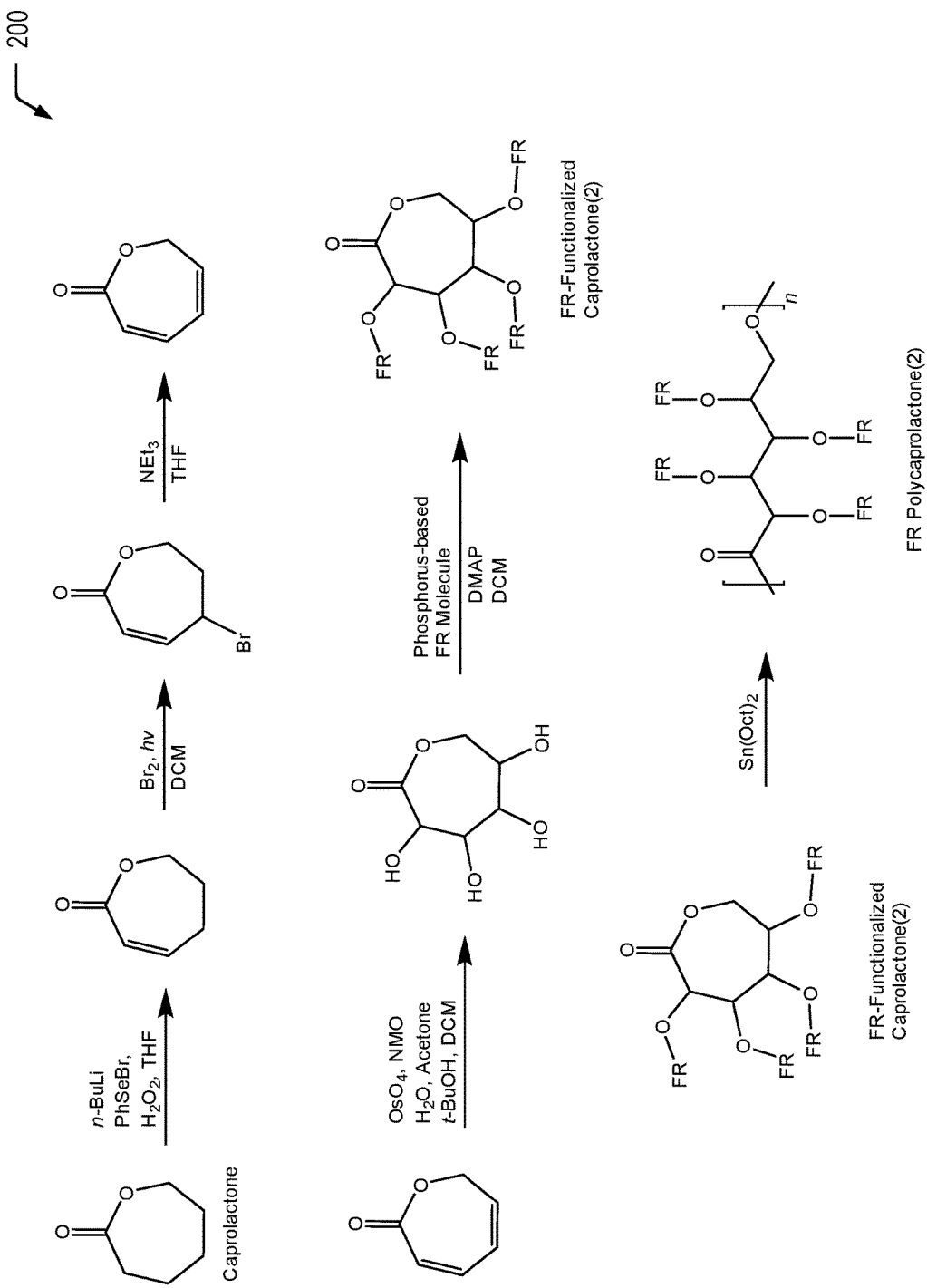
FIG. 2 is a chemical reaction diagram showing a process of forming a second FR-functionalized caprolactone molecule using a phosphorus-based FR molecule and polymerizing the second FR-functionalized caprolactone molecule to form a second FR polycaprolactone, according to one embodiment.

Referring to FIG. 2, a chemical reaction diagram 200 illustrates a process of forming a second FR-functionalized caprolactone molecule using a phosphorus-based FR molecule and polymerizing the second FR-functionalized caprolactone molecule to form a second FR polycaprolactone, according to one embodiment. As further described herein, the phosphorus-based FR molecule may correspond to one of the phosphorus-based FR molecules synthesized according to one of the processes described herein with respect to FIGS. 9A/9B, 11A/B, 13, 14A/14B, 15A/B, and 16A/B. As further described herein, the phosphorus-based FR molecules that may be utilized to impart flame retardancy characteristics to a caprolactone molecule may also include one or more cross-linking groups.

FIG. 2 illustrates that the second FR-functionalized caprolactone molecule may be synthesized from a caprolactone molecule via a polyol intermediate (that includes four hydroxyl groups). In the chemical reactions depicted at the top of FIG. 2, two carbon-carbon double bonds are added to the caprolactone molecule. In the chemical reactions depicted in the middle of FIG. 2, a 2,3,4,5-hydroxyl-caprolactone molecule may be synthesized via an Upjohn dihydroxylation involving catalytic osmium tetroxide.

In the chemical reactions depicted at the bottom of FIG. 2, the four hydroxyl groups of the 2,3,4,5-hydroxyl-caprolactone molecule are functionalized with one of the phosphorus-based flame retardant molecules described herein with catalytic DMAP to form the second FR-functionalized caprolactone molecule. The second FR-functionalized caprolactone molecule is then polymerized using catalytic tin(II) octanoate to form a second FR polycaprolactone (with cross-linkers, not shown in FIG. 2).

The first chemical reaction depicted at the top of FIG. 2 may be performed in a similar manner to the first chemical reaction depicted at the top of FIG. 1. With respect to the second chemical reaction depicted at the top of FIG. 2, as a prophetic example, to a stirred anhydrous solution of the "caprolactone-diene" in a solution of either anhydrous DCM or benzene, may be added bromine dropwise. The solution may include a free radical initiator such as azobisisobutyronitrile (AIBN) or benzoyl peroxide. The solution may be heated to reflux and/or placed under UV radiation (hv) of approximately 254 nm. Upon completion, the reaction may be filtered or quenched with a sodium thiosulfate solution, and the layers may be separated. The organic layer may be rinsed with water and brine and may be dried over MgSO$_4$.

The solvent may be removed in vacuo, and the residue may be purified by recrystallization or column chromatography.

As a prophetic example, referring to the third chemical reaction depicted at the top of FIG. 2, to a stirred anhydrous solution of the "bromocaprolactone-diene" in a solution of either anhydrous DCM or THF, may be added a solution of NEt$_3$ in the same solvent, dropwise. The solution may be heated to reflux. Upon completion, the reaction may be quenched with a sodium thiosulfate solution, and the layers may be separated. The organic layer may be rinsed with water and brine, and may be dried over MgSO$_4$. The solvent may be removed in vacuo, and the residue may be purified by recrystallization or column chromatography.

The fourth chemical reaction depicted in the middle of FIG. 2 may be performed in a similar manner to the second chemical reaction depicted at the top of FIG. 1, except for doubling the number of equivalents to form a "tetrahydroxycaprolactone" rather than a "dihydroxycaprolactone" as in the example of FIG. 1. The fifth chemical reaction depicted in the middle of FIG. 2 may be performed in a manner similar to the third chemical reaction depicted at the bottom of FIG. 1, except for doubling the number of equivalents of the phosphorus-based FR molecule. The sixth chemical reaction depicted at the bottom of FIG. 2 may be performed in a manner similar to the fourth chemical reaction depicted at the bottom of FIG. 1.

Thus, FIG. 2 illustrates an example of a process of forming a second FR-functionalized caprolactone molecule using a phosphorus-based FR molecule and polymerizing the second FR-functionalized caprolactone molecule to form a second FR polycaprolactone. As further described herein, the phosphorus-based molecule that is used to form the second FR-functionalized caprolactone molecule may also include one or more cross-linking functional groups for subsequent cross-linking of the second FR polycaprolactone.

Figure 3:
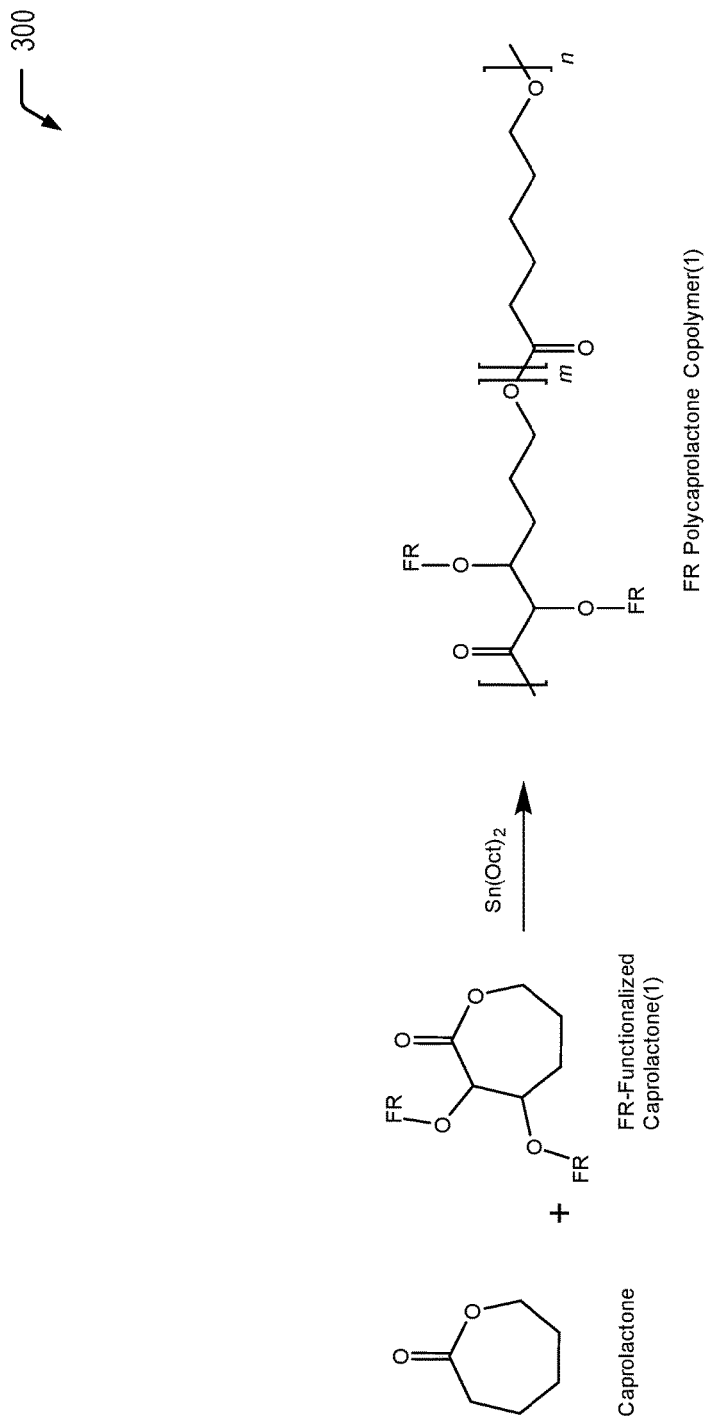
FIG. 3 is a chemical reaction diagram showing a process of forming a first FR polycaprolactone copolymer from a mixture of monomers that includes a non-functionalized caprolactone monomer and the first FR-functionalized caprolactone of FIG. 1, according to one embodiment.

Referring to FIG. 3, a chemical reaction diagram 300 illustrates a process of forming a first FR polycaprolactone copolymer from a mixture of monomers that includes a non-functionalized caprolactone monomer and the first FR-functionalized caprolactone of FIG. 1, according to one embodiment.

In FIG. 3, the integer m is used to designate a first portion of the first FR polycaprolactone copolymer that corresponds to the FR-functionalized caprolactone monomer. The integer n is used to designate a second portion of the first FR polycaprolactone copolymer that corresponds to the unfunctionalized caprolactone monomer. In the example of FIG. 3, the FR-functionalized caprolactone monomer includes two phosphorus-based flame retardant groups per molecule. Accordingly, the first portion of the FR polycaprolactone copolymer of FIG. 3 includes two phosphorus-based flame retardant groups per repeat unit. Adjusting the relative amounts of the monomers in the mixture enables control over the flame retardant and physical/thermal properties of the resulting copolymer.

As a prophetic example, an unfunctionalized caprolactone, the FR-functionalized caprolactone containing two FR groups, and a catalyst such as tin (II) octanoate, Sn(Oct)$_2$ (0.1-1 mol %), may be added to a reaction vessel, which may contain a solvent such as DCM. After a period of up to 24 hours, the melt or solution may be added directly to hexanes or methanol, dropwise or all in one portion, to precipitate the polymer, which may be collected by filtration and dried in a vacuum oven at >60° C. until complete removal of volatiles (determined by thermogravimetric analysis).

Thus, FIG. 3 illustrates an example of a process of forming a FR polycaprolactone copolymer from a mixture of monomers that includes a non-functionalized caprolactone monomer and a FR-functionalized caprolactone monomer. As further described herein, the phosphorus-based molecule that is used to form the FR-functionalized caprolactone monomer may also include one or more cross-linking functional groups for cross-linking of the FR polycaprolactone copolymer.

Figure 4:
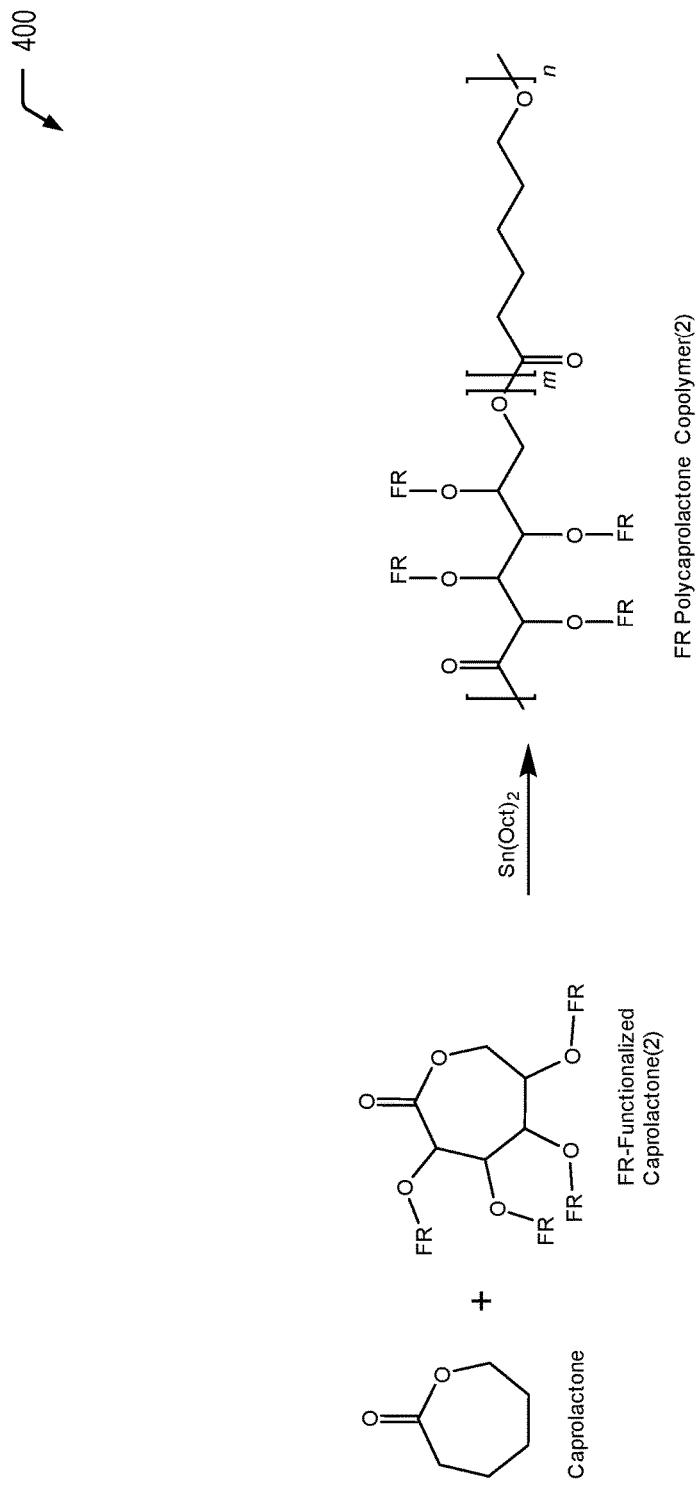
FIG. 4 is a chemical reaction diagram showing a process of forming a second FR polycaprolactone copolymer from a mixture of a non-functionalized caprolactone monomer and the second FR-functionalized caprolactone of FIG. 2, according to one embodiment.

Referring to FIG. 4, a chemical reaction diagram 400 illustrates a process of forming a second FR polycaprolactone copolymer from a mixture of monomers that includes an unfunctionalized caprolactone monomer and the second FR-functionalized caprolactone of FIG. 2, according to one embodiment.

In FIG. 4, the integer m is used to designate a first portion of the second FR polycaprolactone copolymer that corresponds to the FR-functionalized caprolactone monomer. The integer n is used to designate a second portion of the second FR polycaprolactone copolymer that corresponds to the unfunctionalized caprolactone monomer. In the example of FIG. 4, the FR-functionalized caprolactone monomer includes four phosphorus-based flame retardant groups per molecule. Accordingly, the first portion of the FR polycaprolactone copolymer of FIG. 4 includes four phosphorus-based flame retardant groups per repeat unit. Adjusting the relative amounts of the monomers in the mixture enables control over the flame retardant and physical/thermal properties of the resulting copolymer.

As a prophetic example, an unfunctionalized caprolactone, the FR-functionalized caprolactone containing four FR groups, and a catalyst such as tin (II) octanoate, $Sn(Oct)_2$ (0.1-1 mol %), may be added to a reaction vessel, which may contain a solvent such as DCM. After a period of up to 24 hours, the melt or solution may be added directly to hexanes or methanol, dropwise or all in one portion, to precipitate the polymer, which may be collected by filtration and dried in a vacuum oven at $>60°$ C. until complete removal of volatiles (determined by thermogravimetric analysis).

Thus, FIG. 4 illustrates an example of a process of forming a FR polycaprolactone copolymer from a mixture of monomers that includes an unfunctionalized caprolactone monomer and a FR-functionalized caprolactone monomer. As further described herein, the phosphorus-based molecule that is used to form the FR-functionalized caprolactone monomer may also include one or more cross-linking functional groups for cross-linking of the FR polycaprolactone copolymer.

Figure 5:
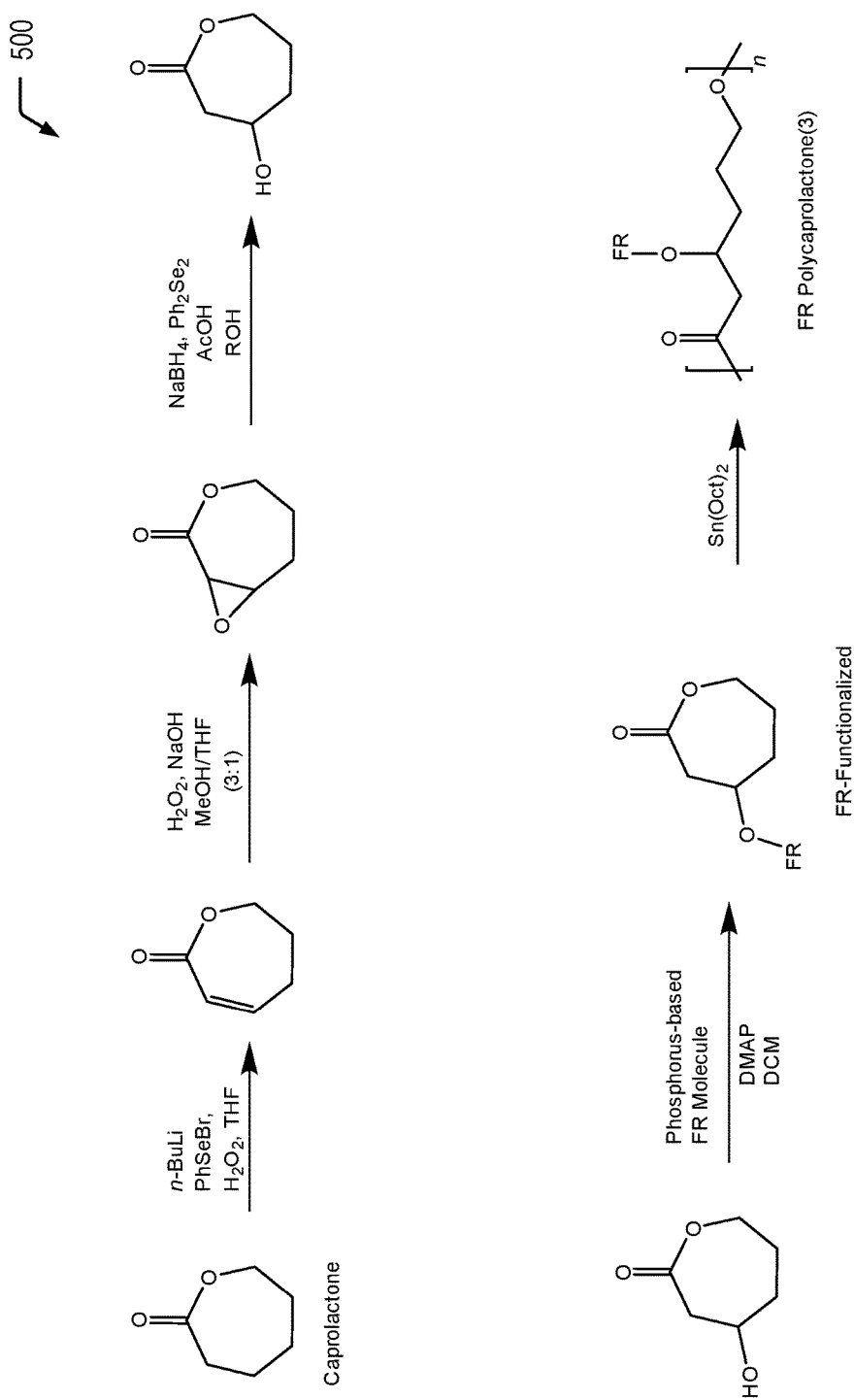
FIG. 5 is a chemical reaction diagram showing a process of forming a third FR-functionalized caprolactone using a phosphorus-based FR molecule and polymerizing the third FR-functionalized caprolactone to form a third FR polycaprolactone, according to one embodiment.

Referring to FIG. 5, a chemical reaction diagram 500 illustrates a process of forming a third FR-functionalized caprolactone molecule using a phosphorus-based FR molecule and polymerizing the third FR-functionalized caprolactone molecule to form a third FR polycaprolactone, according to one embodiment. As further described herein, the phosphorus-based FR molecule may correspond to one of the phosphorus-based FR molecules synthesized according to one of the processes described herein with respect to FIGS. 9A/9B, 11A/B, 13, 14A/14B, 15A/B, and 16A/B. As further described herein, the phosphorus-based FR molecules that may be utilized to impart flame retardancy characteristics to a caprolactone molecule may also include one or more cross-linking groups.

FIG. 5 illustrates that the third FR-functionalized caprolactone molecule may be synthesized from a caprolactone molecule via an epoxide (oxirane) intermediate. In the first chemical reaction depicted at the top of FIG. 5, a carbon-carbon double bond is added to the caprolactone molecule to form an intermediate molecule. The second chemical reaction illustrates that a 2-oxiranyl-caprolactone molecule may be synthesized from the intermediate molecule using hydrogen peroxide. The fourth chemical reaction illustrates that the epoxide rings are then opened via a reductive ring-opening using sodium borohydride and phenyl diselenide to form 3-hydroxyl-caprolactone.

In the fifth chemical reaction (depicted at the bottom of FIG. 5), the hydroxyl group of the 3-hydroxyl-caprolactone molecule are functionalized with one of the phosphorus-based flame retardant molecules described herein with catalytic DMAP to form the third FR-functionalized caprolactone molecule. The sixth chemical reaction illustrates that the third FR-functionalized caprolactone molecule is then polymerized using catalytic tin(II) octanoate to form a third FR polycaprolactone (with cross-linkers, not shown in FIG. 5).

The first chemical reaction depicted at the top of FIG. 5 may be performed in a similar manner to the first chemical reaction depicted at the top of FIG. 1. With respect to the second chemical reaction depicted at the top of FIG. 5, as a prophetic example, to a solution of the "caprolactone-diene" (1 equiv.) in MeOH-THF (3:1) may be added aqueous 35% $H_2O_2$ ($>0.5$ equiv.) and 6M aqueous NaOH (1.25 equiv.) at $0°$ C. After being stirred at the same temperature for 2 h, $H_2O$, ether, and 2M aqueous HCl may be added to the reaction mixture. The organic phase may be separated, and the aqueous phase may be extracted with ether (2x). The combined organic extracts may be washed with brine, dried over anhydrous $Na_2SO_4$, and concentrated in vacuo. The residue may be purified by silica gel column chromatography.

As a prophetic example, referring to the third chemical reaction depicted at the top of FIG. 5, to a stirred solution of (1.5 equiv.) diphenyl diselenide, $Ph_2Se_2$, in isopropanol may be added $NaBH_4$ (3.0 equiv.) portion-wise at room temperature, and after a few minutes AcOH (70% v/v of isopropanol) may be added at the same temperature. After 5 minutes, the mixture may be cooled to $0°$ C., and a solution of the "epoxy caprolactone" (1.0 equiv.) in isopropanol may be added dropwise to the mixture. Stirring may continue for 30 min at the same temperature. The mixture may be diluted with EtOAc, and the organic layer may be washed with brine and dried with $MgSO_4$. After evaporation of the solvent under reduced pressure, the residue may be purified by column chromatography.

The fourth chemical reaction depicted at the bottom of FIG. 5 may be performed in a similar manner to the third chemical reaction depicted at the bottom of FIG. 1, except for halving the number of equivalents of the phosphorus-based FR molecule. The fifth chemical reaction depicted at the bottom of FIG. 5 may be performed in a manner similar to the fourth chemical reaction depicted at the bottom of FIG. 1.

Thus, FIG. 5 illustrates an example of a process of forming a third FR-functionalized caprolactone molecule using a phosphorus-based FR molecule and polymerizing the third FR-functionalized caprolactone molecule to form a third FR polycaprolactone. As further described herein, the phosphorus-based molecule that is used to form the third FR-functionalized caprolactone molecule may also include one or more cross-linking functional groups for subsequent cross-linking of the third FR polycaprolactone.

Figure 6:
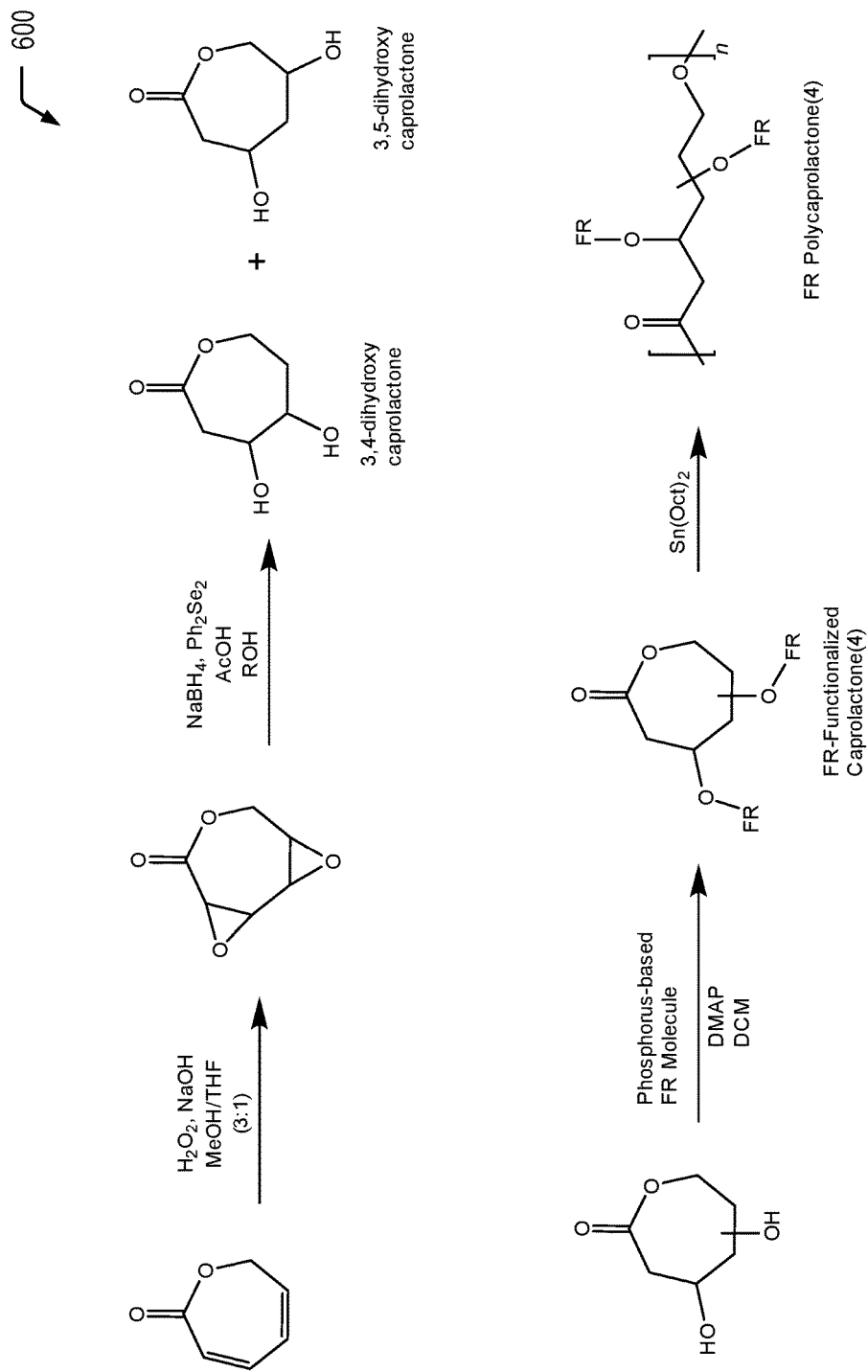
FIG. 6 is a chemical reaction diagram showing a process of forming a fourth FR-functionalized caprolactone using a phosphorus-based FR molecule and polymerizing the fourth FR-functionalized caprolactone to form a fourth FR polycaprolactone, according to one embodiment.

Referring to FIG. 6, a chemical reaction diagram 600 illustrates a process of forming a fourth FR-functionalized caprolactone molecule using a phosphorus-based FR molecule and polymerizing the fourth FR-functionalized caprolactone molecule to form a fourth FR polycaprolactone, according to one embodiment. As further described herein, the phosphorus-based FR molecule may correspond to one of the phosphorus-based FR molecules synthesized according to one of the processes described herein with respect to FIGS. 9A/9B, 11A/B, 13, 14A/14B, 15A/B, and 16A/B. As further described herein, the phosphorus-based FR molecules that may be utilized to impart flame retardancy characteristics to a caprolactone molecule may also include one or more cross-linking groups. The chemical reactions depicted in FIG. 6 may be performed in a similar manner to the chemical reactions previously described herein with respect to FIG. 5, except for doubling the number of equivalents of the appropriate reagents.

FIG. 6 illustrates that the fourth FR-functionalized caprolactone molecule may be synthesized from a caprolactone molecule via an epoxide (oxirane) intermediate. For ease of illustration purposes, the first molecule depicted at the top left of FIG. 6 corresponds to the molecule of FIG. 2 having two carbon-carbon double bonds that are added to the caprolactone molecule. In the first chemical reaction depicted at the top of FIG. 6, a 2,3,4,5-dioxiranyl-caprolactone molecule may be synthesized using hydrogen peroxide. FIG. 6 further illustrates that the epoxide rings are then opened via a reductive ring-opening using sodium borohydride and phenyl diselenide. The reaction conditions may result in a mixture of stereochemistry to form a mixture of 3,4-hydroxyl-caprolactone and 3,5-hydroxyl-caprolactone.

In the chemical reactions depicted at the bottom of FIG. 6, the hydroxyl groups of the 3,4-hydroxyl-caprolactone and 3,5-hydroxyl-caprolactone molecules are functionalized with one of the phosphorus-based flame retardant molecules described herein with catalytic DMAP to form the fourth FR-functionalized caprolactone molecule. FIG. 6 further illustrates that the fourth FR-functionalized caprolactone molecule is then polymerized using catalytic tin(II) octanoate to form a fourth FR polycaprolactone (with cross-linkers, not shown in FIG. 6).

Thus, FIG. 6 illustrates an example of a process of forming a fourth FR-functionalized caprolactone molecule using a phosphorus-based FR molecule and polymerizing the fourth FR-functionalized caprolactone molecule to form a fourth FR polycaprolactone. As further described herein, the phosphorus-based FR molecule that is used to form the fourth FR-functionalized caprolactone molecule may also include one or more cross-linking functional groups for subsequent cross-linking of the fourth FR polycaprolactone.

Figure 7:
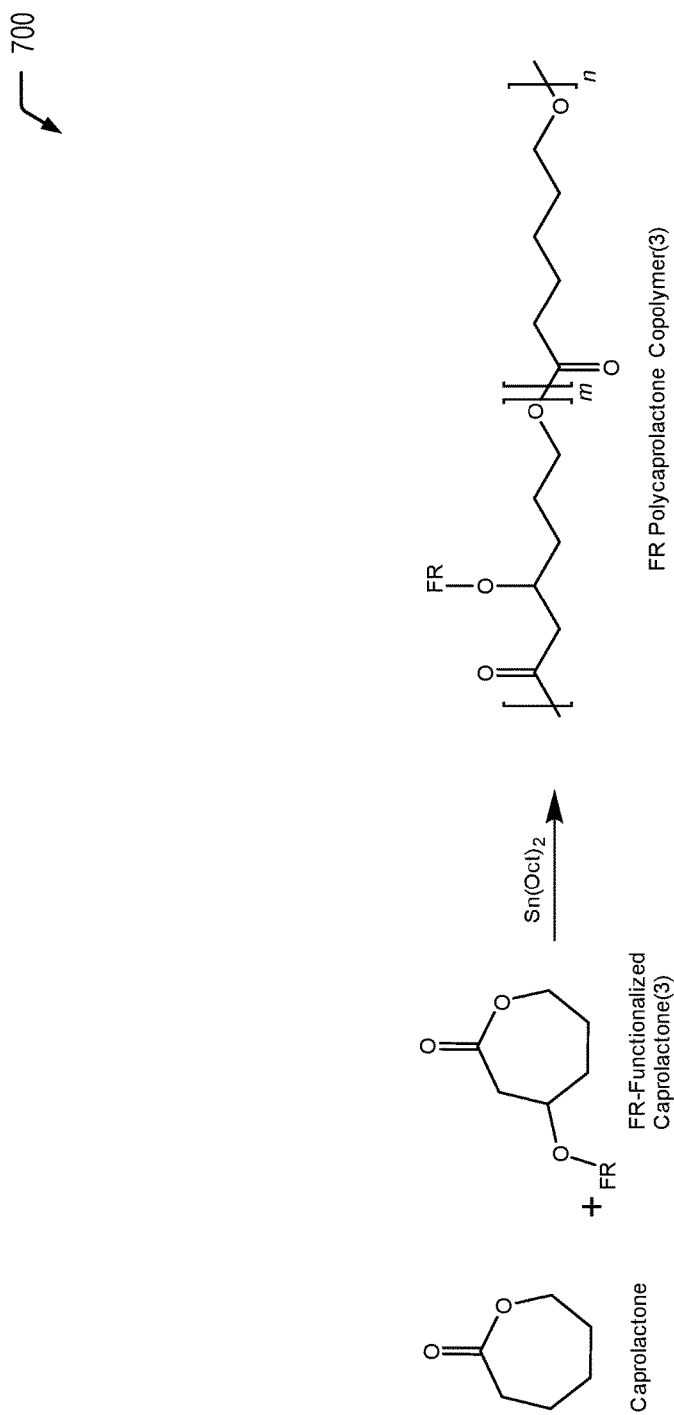
FIG. 7 is a chemical reaction diagram showing a process of forming a third FR polycaprolactone copolymer from a mixture of a non-functionalized caprolactone monomer and the third FR-functionalized caprolactone of FIG. 5, according to one embodiment.

Referring to FIG. 7, a chemical reaction diagram 700 illustrates a process of forming a third FR polycaprolactone copolymer from a mixture of monomers that includes an unfunctionalized caprolactone monomer and the third FR-functionalized caprolactone monomer of FIG. 5, according to one embodiment. The chemical reaction depicted in FIG. 7 may be performed in a similar manner to the co-polymerization reaction previously described herein with respect to FIGS. 3 and 4.

In FIG. 7, the integer m is used to designate a first portion of the third FR polycaprolactone copolymer that corresponds to the FR-functionalized caprolactone monomer. The integer n is used to designate a second portion of the first FR polycaprolactone copolymer that corresponds to the unfunctionalized caprolactone monomer. In the example of FIG. 7, the FR-functionalized caprolactone monomer includes one phosphorus-based flame retardant group per molecule. Accordingly, the first portion of the FR polycaprolactone copolymer of FIG. 7 includes one phosphorus-based flame retardant group per repeat unit. Adjusting the relative amounts of the monomers in the mixture enables control over the flame retardant and physical/thermal properties of the resulting copolymer.

Thus, FIG. 7 illustrates an example of a process of forming a FR polycaprolactone copolymer from a mixture of monomers that includes an unfunctionalized caprolactone monomer and a FR-functionalized caprolactone monomer. As further described herein, the phosphorus-based molecule that is used to form the FR-functionalized caprolactone monomer may also include one or more cross-linking functional groups for cross-linking of the FR polycaprolactone copolymer.

Figure 8:
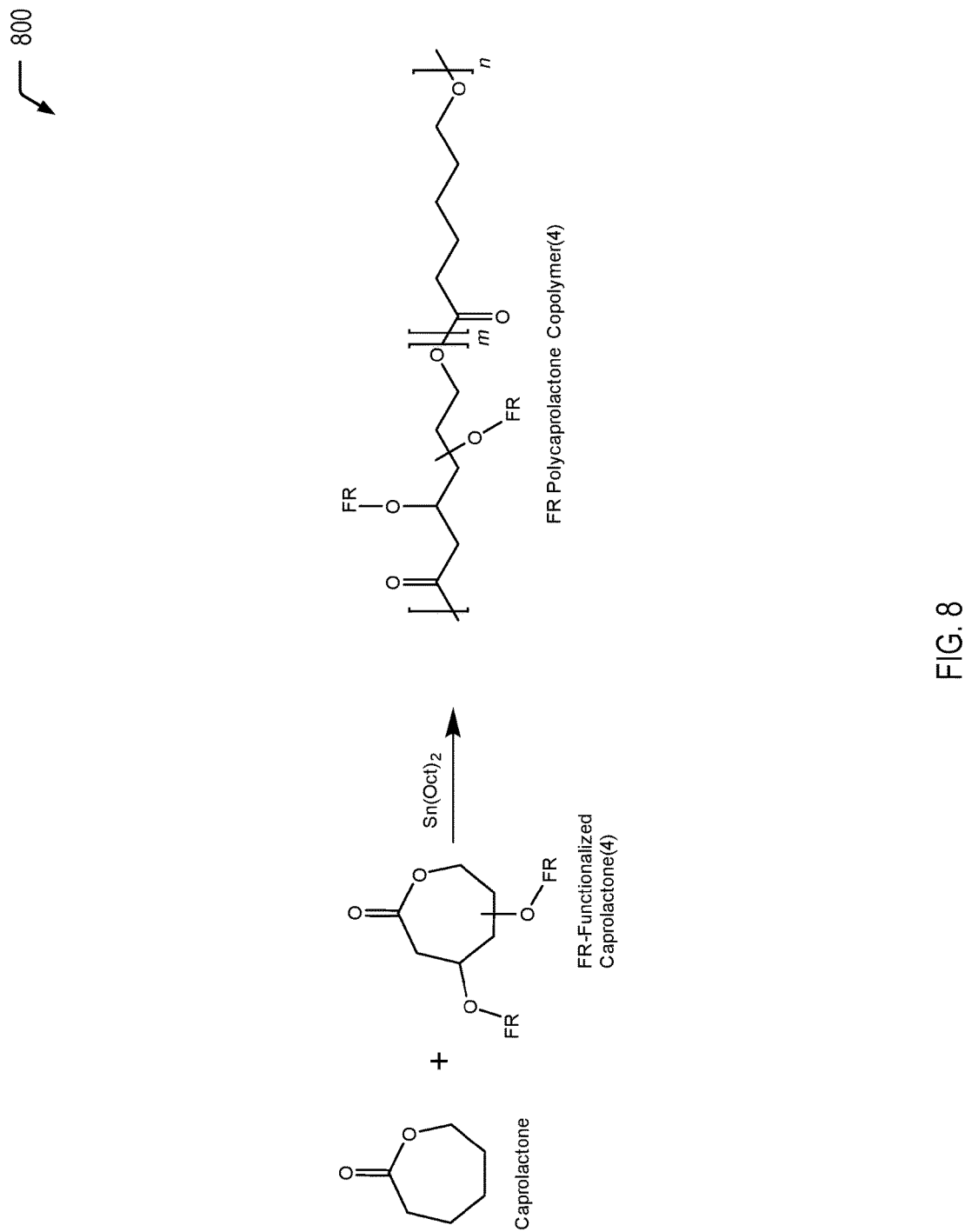
FIG. 8 is a chemical reaction diagram showing a process of forming a fourth FR polycaprolactone copolymer from a mixture of a non-functionalized caprolactone monomer and the fourth FR-functionalized caprolactone of FIG. 6, according to one embodiment.

Referring to FIG. 8, a chemical reaction diagram 800 illustrates a process of forming a fourth FR polycaprolactone copolymer from a mixture of monomers that includes an unfunctionalized caprolactone monomer and the fourth FR-functionalized caprolactone of FIG. 6, according to one embodiment. The chemical reaction depicted in FIG. 8 may be performed in a similar manner to the co-polymerization reaction previously described herein with respect to FIGS. 3 and 4.

In FIG. 8, the integer m is used to designate a first portion of the first FR polycaprolactone copolymer that corresponds to the FR-functionalized caprolactone monomer. The integer n is used to designate a second portion of the first FR polycaprolactone copolymer that corresponds to the unfunctionalized caprolactone monomer. In the example of FIG. 8, the FR-functionalized caprolactone monomer includes two phosphorus-based flame retardant groups per molecule. Accordingly, the first portion of the FR polycaprolactone copolymer of FIG. 8 includes two phosphorus-based flame retardant groups per repeat unit. Adjusting the relative amounts of the monomers in the mixture enables control over the flame retardant and physical/thermal properties of the resulting copolymer.

Thus, FIG. 8 illustrates an example of a process of forming a FR polycaprolactone copolymer from a mixture of monomers that includes an unfunctionalized caprolactone monomer and a FR-functionalized caprolactone monomer. As further described herein, the phosphorus-based molecule that is used to form the FR-functionalized caprolactone monomer may also include one or more cross-linking functional groups for cross-linking of the FR polycaprolactone copolymer.

FIGS. 9A and 9B are chemical reaction diagrams showing alternative embodiments of processes of forming a first phosphorus-based FR molecule for formation of a FR-functionalized caprolactone molecule. The first phosphorus-based FR molecule depicted in FIGS. 9A and 9B represents an example of a phosphate-based FR molecule that is functionalized with one moiety for cross-linking and one chloride for further bonding with a caprolactone molecule that is functionalized with one or more hydroxyl groups, as previously described herein with respect to FIGS. 1, 2, 5, and 6.

Referring to FIG. 9A, a first chemical reaction diagram 900 illustrates a first embodiment of a process of forming the first phosphorus-based FR molecule. In FIG. 9A, the first phosphorus-based FR molecule is formed via a one-step process via reaction of an alcohol (ROH) with phenyl dichlorophosphate via careful addition and stoichiometric control. FIG. 9A illustrates that the alcohol may be either allylic alcohol or glycidol. In the case of allylic alcohol, the R group of the first phosphorus-based FR molecule includes an allyl functional group that may be utilized as a polymeric cross-linker. In the case of glycidol, the R group of the first phosphorus-based FR molecule includes a terminal epoxide functional group that may be utilized as a cross-linker.

As a prophetic example, to a stirred solution that may include allylic alcohol or glycidol (1.0 eq.) and triethylamine (2.0 eq.) in anhydrous THF, phenyl dichlorophosphate (1.3 eq.) may be added dropwise at 0° C., and the reaction mixture may be stirred at ambient temperature for 2 hours or the reaction mixture may be heated up to reflux (60-65° C.) for an extended reaction time (4 hours). The reaction mixture may be cooled to ambient temperature and filtered to remove the triethylamine hydrochloride salt. The solvents of the filtrate may be removed in vacuo, and the product may be purified by fractional distillation.

Referring to FIG. 9B, a second chemical reaction diagram 910 illustrates an alternative embodiment of a process of forming the first phosphorus-based FR molecule. The first chemical reaction depicted in FIG. 9B illustrates that the alcohol (ROH) may be reacted with titanium (IV) isopropoxide and phosphonic acid diphenyl ester via a pseudo-esterification to form an intermediate molecule. The second chemical reaction depicted in FIG. 9B illustrates that the intermediate molecule may be reacted with thionyl chloride to form the first phosphorus-based FR molecule. When the alcohol is allylic alcohol, the R group of the first phosphorus-based FR molecule includes an allyl functional group that may be utilized as a polymeric cross-linker. When the alcohol is glycidol, the R group of the first phosphorus-based FR molecule includes a terminal epoxide functional group that may be utilized as a cross-linker.

As a prophetic example, diaryl phosphite (5.5 mmol) may be added to a solution of titanium (IV) isopropoxide, Ti(OPr)$_4$ (11 mmol), in allylic alcohol or glycidol (excess). This solution may be diluted with benzene. The reaction mixture may be heated to 40° C. until completion. The mixture may be poured into water, extracted with $CH_2Cl_2$ (3x), dried over $MgSO_4$, and solvent and volatile components may be removed in vacuo. The products may be purified by fractional distillation or recrystallization. The product from the first step (1.0 eq.), in dry acetonitrile (MeCN), toluene, or dichloromethane (DCM), may be added to a solution of trichloroisocyanuric acid (0.33 eq.), N-chlorosuccinimide (1.0 eq.), or tert-butyl hypochlorite (1.0 eq.) in the same solvent at room temperature, under an $N_2$ atmosphere. Upon formation of a precipitate, the reaction may be stirred at room temperature for an additional 2 hours. Upon completion of the reaction, as determined by $^{31}P$ NMR, the reaction mixture may be passed through a 0.45 μm Whatman syringe filter and concentrated under vacuum. Next, thionyl chloride ($SOCl_2$) may be dissolved in a suitable solvent, such as carbon tetrachloride ($CCl_4$), and the chemical reaction may be performed from 0° C. to room temperature.

Thus, FIGS. 9A and 9B illustrate alternative processes of forming a phosphate-based FR molecule that is functionalized with one moiety for cross-linking and one chloride for further bonding with a caprolactone molecule that is functionalized with one or more hydroxyl groups. While FIGS. 9A and 9B illustrate an example in which the phosphate-based FR molecule includes a phenyl group, it will be appreciated that the phenyl group may be substituted by ethyl, methyl, propyl, or isopropyl groups, among other alternatives.

Figure 10:
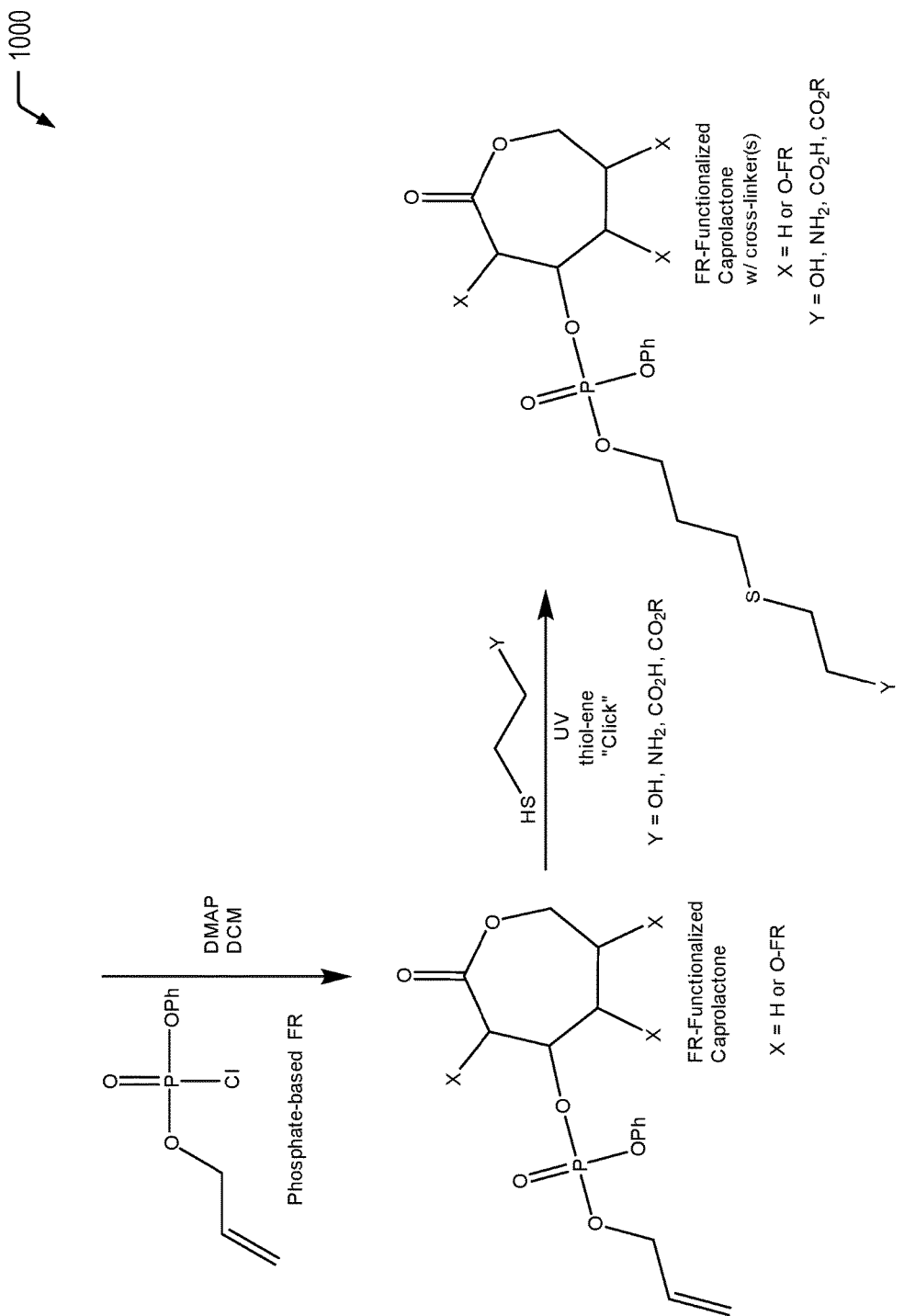
FIG. 10 is a chemical reaction diagram showing a process of forming a FR-functionalized caprolactone molecule with one or more cross-linkers from a caprolactone molecule that is functionalized with a phosphate-based FR molecule that includes an allyl group, according to one embodiment.

Referring to FIG. 10, a chemical reaction diagram 1000 illustrates an example of a process of forming a FR-functionalized caprolactone molecule with one or more cross-linkers from a caprolactone molecule that is functionalized with a phosphate-based FR molecule that includes an allyl group, according to one embodiment.

In FIG. 10, the letter Y is used to represent a hydroxyl group, an amine group, a carboxylic acid group, or an ester group. FIG. 10 illustrates that the allyl-functionalized caprolactone molecule (formed according to one of the processes described herein with respect to FIGS. 9A and 9B) may be chemically reacted with a molecule that includes a thiol group and the Y group via thiol-ene "Click" chemistry to form a FR-functionalized caprolactone molecule that includes a hydroxyl cross-linker, an amine cross-linker, a carboxylic acid cross-linker, or an ester cross-linker.

As a prophetic example, the thiol compound may be mixed with the vinyl-functionalized FR-functionalized caprolactone. The mixture may include a radical initiator, such as a Micheler's ketone, an alpha-amino-ketone, an alpha-hydroxy-ketone, a benzyldimethyl ketal, or benzophenone (among other alternatives). The reactants may be dissolved in a solvent such as DCM, benzene, or carbon tetrachloride and reacted under UV light at a time and temperature suitable to the included radical initiators as appropriate for desired applications.

Figure 11A:
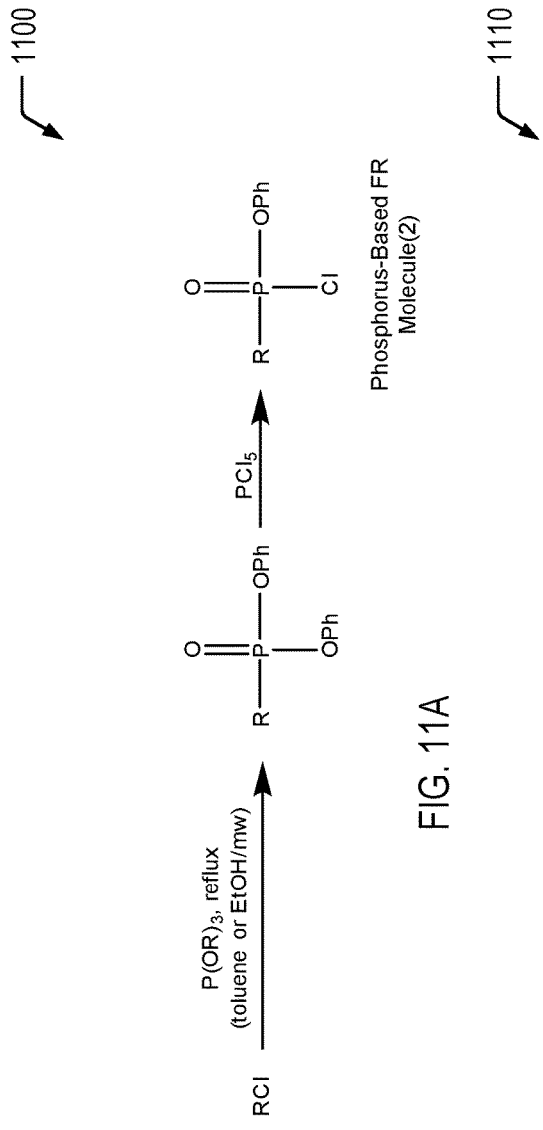
FIGS. 11A and 11B are chemical reaction diagrams showing alternative embodiments of processes of forming a second phosphorus-based FR molecule for forming a FR-functionalized caprolactone molecule.
Figure 11A:
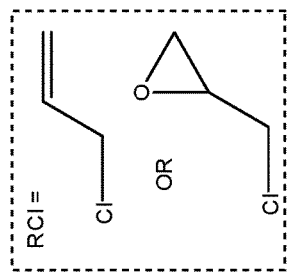
Figure 11B:
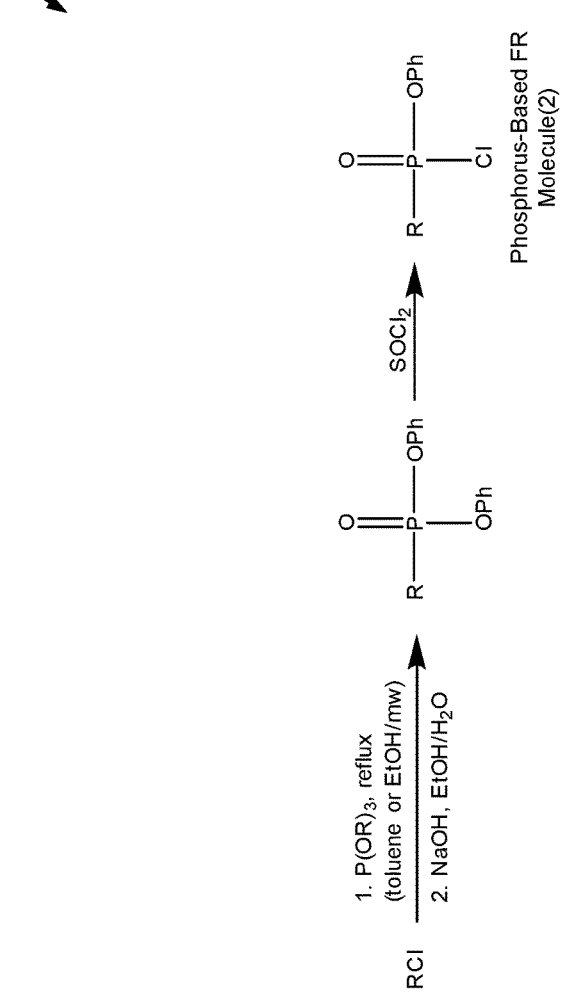
Figure 11B:
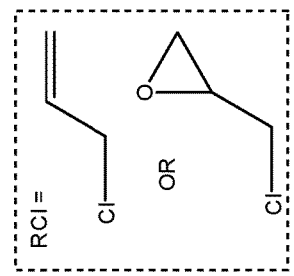

FIGS. 11A and 11B are chemical reaction diagrams showing alternative embodiments of processes of forming a second phosphorus-based FR molecule for formation of a FR-functionalized caprolactone molecule. The second phosphorus-based FR molecule depicted in FIGS. 11A and 11B represents an example of a phosphonate-based FR molecule that is functionalized with one moiety for cross-linking and one chloride for further bonding with a caprolactone molecule that is functionalized with one or more hydroxyl groups, as previously described herein with respect to FIGS. 1, 2, 5, and 6.

Referring to FIG. 11A, a first chemical reaction diagram 1100 illustrates a first embodiment of a process of forming the second phosphorus-based FR molecule. In the first chemical reaction depicted in FIG. 11A, a chloride molecule (RCl) is chemically reacted with triphenylphosphite to form a phosphonyl ester intermediate material. In the second chemical reaction depicted in FIG. 11A, the phosphonyl ester intermediate material is chemically reacted with phosphorus pentachloride to form the second phosphorus-based FR molecule. FIG. 11A illustrates that the chloride may be either allyl chloride or epichlorohydrin. In the case of allyl chloride, the R group of the second phosphorus-based FR molecule includes an allyl functional group that may be utilized as a polymeric cross-linker. In the case of epichlorohydrin, the R group of the second phosphorus-based FR molecule includes a terminal epoxide functional group that may be utilized as a cross-linker.

As a prophetic example, allyl chloride or epichlorohydrin (1 eq.) and trialkyl phosphite, P(OR)$_3$, may be added to a reaction vessel. The reaction vessel may include an organic solvent such as toluene, THF, ethanol, or DMF, and may also contain a compound such an alumina. The reaction may be heated to reflux or up to 180° C. if done using neat conditions. The reaction mixture may also be irradiated by microwaves for a short period to increase the reaction rate. The reaction may be cooled to room temperature, and the excess trialkyl phosphite may be removed in vacuo or it may be washed with DCM, and dried using $CaCl_2$ prior to filtration and having the solvents removed in vacuo. The phosphonate may be purified by fractional distillation. To a solution of the phosphonate product may be added $PCl_5$ (excess) at 0° C. under an inert atmosphere. The reaction may be performed in a solvent such as $CCl_4$. The mixture may be allowed to warm up to room temperature and may be stirred for an additional day. The solvent may then be removed in vacuo, and the residue may be distilled to give the product.

Referring to FIG. 11B, a second chemical reaction diagram 1110 illustrates an alternative embodiment of a process of forming the second phosphorus-based FR molecule. In the first chemical reaction depicted in FIG. 11B, a chloride molecule (RCl) is chemically reacted with triphenylphosphite and quenched under aqueous basic conditions to form a phosphonyl ester intermediate material. In the second chemical reaction depicted in FIG. 11B, the phosphonyl ester intermediate material is chemically reacted with thionyl chloride to form the second phosphorus-based FR molecule. FIG. 11B illustrates that the chloride may be either allyl chloride or epichlorohydrin. In the case of allyl chloride, the R group of the second phosphorus-based FR molecule includes a terminal allyl functional group that may be utilized as a polymeric cross-linker. In the case of epichlorohydrin, the R group of the second phosphorus-based FR molecule includes a terminal epoxide functional group that may be utilized as a cross-linker.

As a prophetic example, an allyl phosphonate or oxirane phosphonate (1.0 eq.) may be generated and quickly added to a solution of bromodimethyl borane (1.0 eq.) in an organic solvent such as toluene. The reaction mixture may be warmed to room temperature and stirred overnight. The solvent and volatile byproducts may be removed in vacuo. To a solution of the diaryl phosphorous-containing product, $SOCl_2$ (excess) may be added at 0° C. The mixture may be allowed to warm up to room temperature or heated to 40° C. and may be stirred for an additional day. The solvent may then be removed in vacuo, and the residue may be distilled to give the product.

Thus, FIGS. 11A and 11B illustrate alternative processes of forming a phosphonate-based FR molecule that is functionalized with one moiety for cross-linking and one chloride for further bonding with a caprolactone molecule that is functionalized with one or more hydroxyl groups. While FIGS. 11A and 11B illustrate an example in which the phosphonate-based FR molecule includes a phenyl group, it will be appreciated that the phenyl group may be substituted by ethyl, methyl, propyl, or isopropyl groups, among other alternatives.

Figure 12:
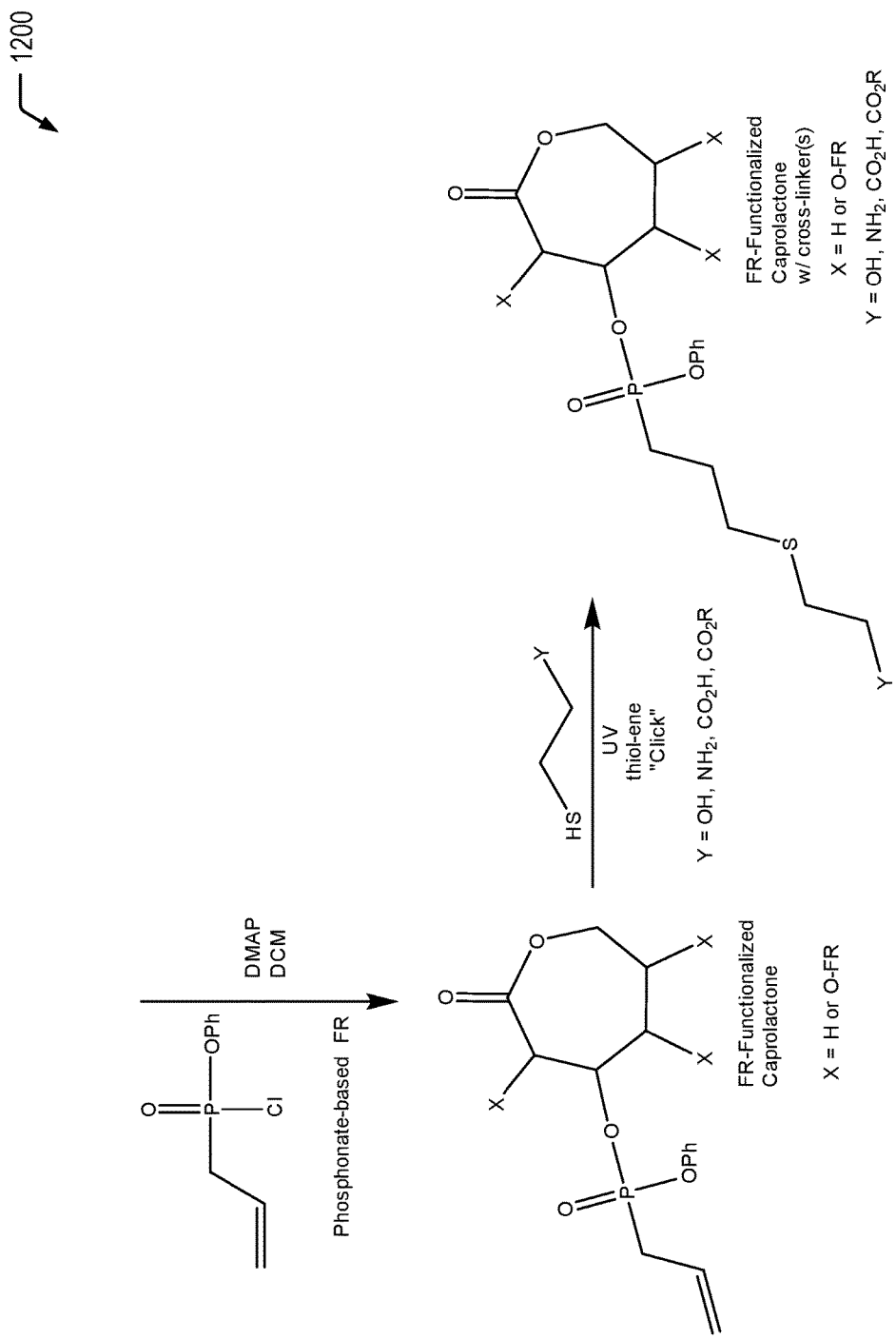
FIG. 12 is a chemical reaction diagram showing a process of forming a FR-functionalized caprolactone molecule with one or more cross-linkers from a caprolactone molecule that is functionalized with a phosphonate-based FR molecule that includes an allyl group, according to one embodiment.

FIG. 12 is a chemical reaction diagram 1200 showing a process of forming a FR-functionalized caprolactone molecule with one or more cross-linkers from a caprolactone molecule that is functionalized with a phosphonate-based FR molecule that includes an allyl group, according to one embodiment.

In FIG. 12, the letter Y is used to represent a hydroxyl group, an amine group, a carboxylic acid group, or an ester group. FIG. 12 illustrates that the allyl-functionalized caprolactone molecule (formed according to one of the processes described herein with respect to FIGS. 11A and 11B) may be chemically reacted with a molecule that includes a thiol group and the Y group via thiol-ene "Click" chemistry to form a FR-functionalized caprolactone molecule that includes a hydroxyl cross-linker, an amine cross-linker, a carboxylic acid cross-linker, or an ester cross-linker.

As a prophetic example, the thiol compound may be mixed with the vinyl-functionalized FR-functionalized caprolactone. The mixture may include a radical initiator, such as a Micheler's ketone, an alpha-amino-ketone, an alpha-hydroxy-ketone, a benzyldimethyl ketal, or benzophenone (among other alternatives). The reactants may be dissolved in a solvent such as DCM, benzene, or carbon tetrachloride and reacted under UV light at a time and temperature suitable to the included radical initiators as appropriate for desired applications.

Figure 13:
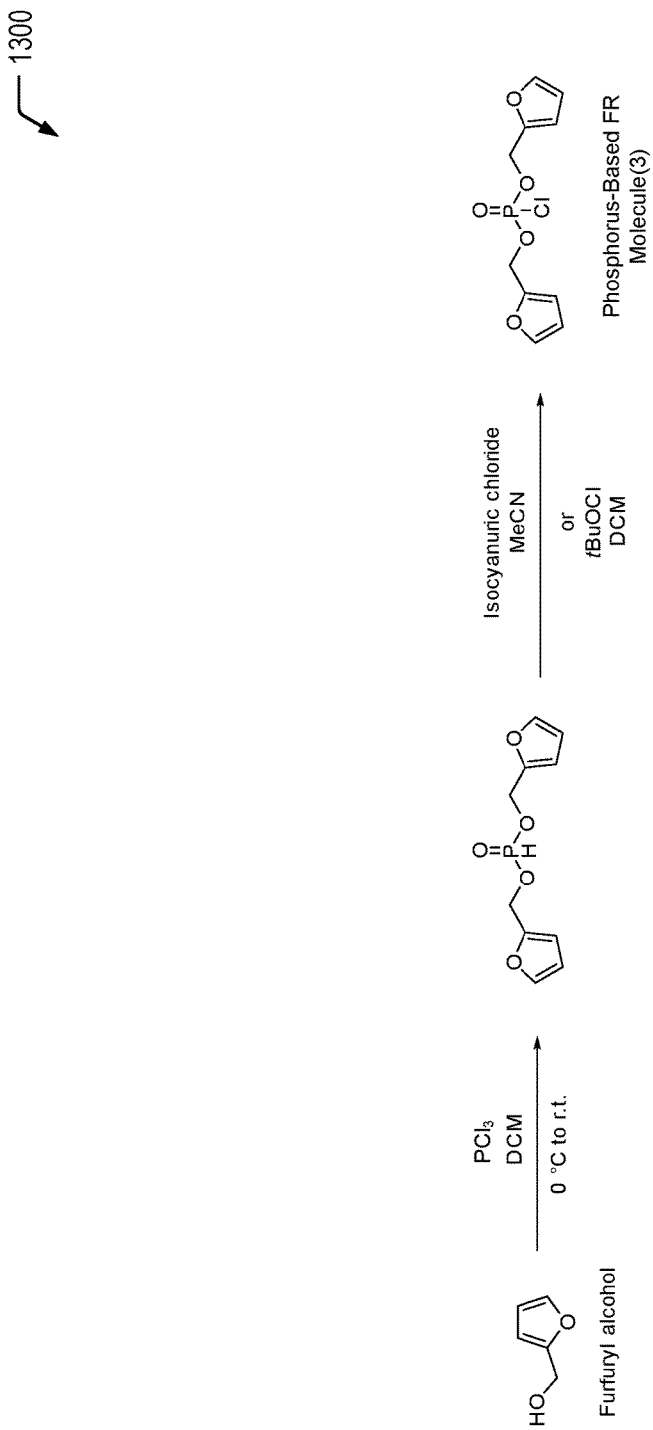
FIG. 13 is a chemical reaction diagram showing a process of forming a third phosphorus-based FR molecule for forming a FR-functionalized caprolactone molecule, according to one embodiment.

Referring to FIG. 13, a chemical reaction diagram 1300 illustrates an example of a process of forming a third phosphorus-based FR molecule for formation of a FR-functionalized caprolactone molecule, according to one embodiment. FIG. 13 illustrates that the third phosphorus-based FR molecule may be synthesized from the renewable furan moiety, furfuryl alcohol.

FIG. 13 illustrates an example of a process of forming a difuran-functionalized phosphate molecule from furfuryl alcohol. In the first chemical reaction depicted in FIG. 13, furfuryl alcohol is chemically reacted with phosphorus trichloride ($PCl_3$) to form a phosphine oxide intermediate material. As an example, the first chemical reaction may include dissolving phosphorus oxychloride in a suitable solvent, such as dichloromethane (DCM), with the reaction proceeding from 0° C. to room temperature. As a prophetic example, phosphorus trichloride and DCM may be placed in a flask immersed in an ice bath and equipped with a magnetic stirrer and a condenser (the head of which is connected to a water vacuum pump). Furfuryl alcohol, diluted with DCM may be added dropwise to the mixture. The mixture may be stirred for another 10 minutes, and DCM may be subsequently evaporated.

As a prophetic example, $PCl_3$ (1.0 eq.) and freshly dried toluene may be added to a two-necked round-bottom flask flushed with inert gas. The reaction mixture may be stirred at 0° C. Furfuryl alcohol (2.0 eq.), dimethylphenylamine (2.16 eq.), and toluene may be added to a separate two-necked round-bottom flask flushed with inert gas. The furfuryl alcohol mixture may be added dropwise to the $PCl_3$ solution over 1 hour. The resulting mixture may be stirred at ambient temperature for 1 additional hour. Upon completion, water may be added carefully and the mixture may be stirred for 30 min at ambient temperature. The crude product may be extracted with $Et_2O$ (2x) and washed with water (2x). The organic phase may be dried ($MgSO_4$) and the solvent may be removed in vacuo, and may be dried or purified further.

In the second chemical reaction depicted in FIG. 13, the phosphine oxide intermediate material is chemically reacted with either isocyanuric chloride or tert-butyl hypochlorite (tBuOCl) to form bis(furylmethylene)phosphoryl chloride. In the case of isocyanuric chloride, the second chemical reaction may include a suitable solvent such as acetonitrile (MeCN). In the case of tert-butyl hypochlorite, the second chemical reaction may include a suitable solvent such as DCM. FIG. 13 illustrates that the resulting molecule has a functional phosphorus group with two furan groups available for subsequent reversible cross-linking.

As a prophetic example (using isocyanuric chloride), bis(furan-2-ylmethyl) phosphite (1.0 eq.) in either dry acetonitrile (MeCN), toluene, or dichloromethane (DCM) may be added to a solution of trichloroisocyanuric acid (0.33 eq.), N-chlorosuccinimide (1.0 eq.), or tert-butyl hypochlorite (1.0 eq.) in the same solvent at room temperature, under an $N_2$ atmosphere. Upon the formation of a precipitate, the reaction may be stirred at room temperature for an additional 2 hours. Upon completion of the reaction, as determined by $^{31}P$ NMR, the reaction mixture was passed through a 0.45 μm Whatman syringe filter and concentrated under vacuum. A similar procedure may be utilized in the case of tert-butyl hypochlorite.

Thus, FIG. 13 illustrates an example of a process of forming a phosphorus-based flame retardant molecule from renewable furfuryl alcohol. In the example of FIG. 13, furfuryl alcohol is used to form a furan-containing FR molecule having two furan moieties bonded to a phosphorus moiety via two phosphoryl linkages. As described further herein, the phosphorus moiety includes a chloride group for bonding (e.g., via chemical reaction with a hydroxyl group), and the two furan moieties provide two potential locations for Diels-Alder reactions with dieonophile group(s) of another material.

Figure 14A:
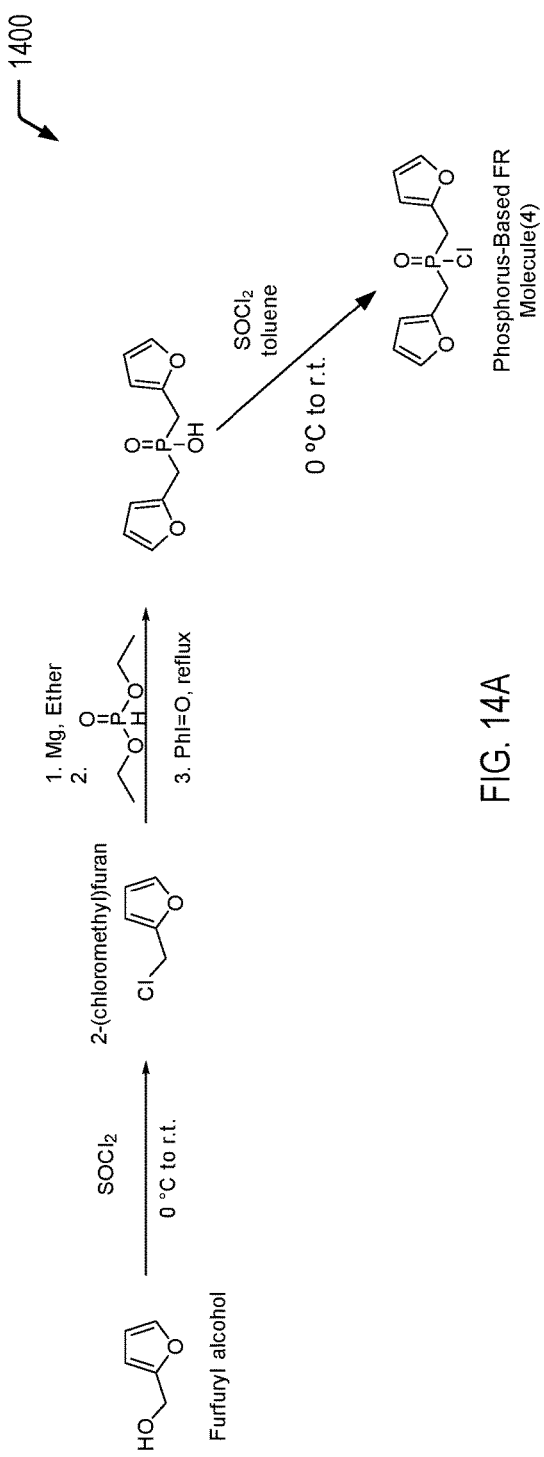
FIGS. 14A and 14B are chemical reaction diagrams showing alternative embodiments of processes of forming a fourth phosphorus-based FR molecule for forming a FR-functionalized caprolactone molecule.
Figure 14B:
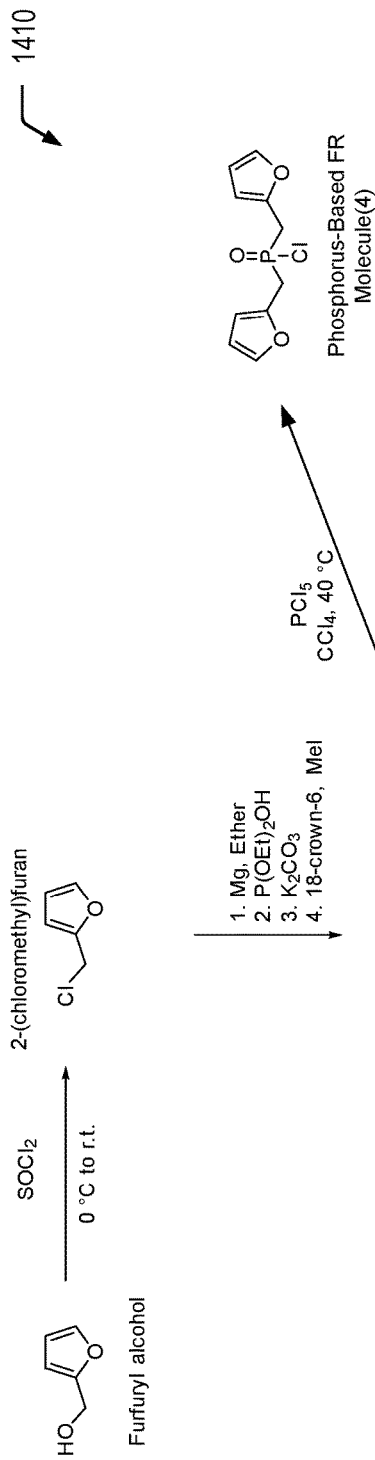

FIGS. 14A and 14B are chemical reaction diagrams showing alternative embodiments of processes of forming a fourth phosphorus-based FR molecule. Referring to FIG. 14A, a first chemical reaction diagram 1400 illustrates a first embodiment of a process of forming the fourth phosphorus-based FR molecule. Referring to FIG. 14B, a second chemical reaction diagram 1410 illustrates an alternative embodiment of a process of forming the fourth phosphorus-based FR molecule.

FIG. 14A illustrates a first example of a process of forming a bisfuran-functionalized phosphine oxide molecule. In the first chemical reaction depicted in FIG. 14A, furfuryl alcohol is chemically reacted with thionyl chloride to form 2-(chloromethyl)furan, and the chemical reaction may be performed from 0° C. to room temperature. Alternatively, bromomethylfuran can be synthesized from commercially available reagents and can be used similarly to chloromethylfuran. In the second chemical reaction depicted in FIG. 14A, a Grignard reagent is prepared and reacted with the appropriate phosphonic acid diester to form a phosphinic acid intermediate material. In the third chemical reaction of FIG. 14A, the phosphinic acid intermediate material is reacted with thionyl chloride, resulting in the fourth phosphorus-based FR molecule.

As a prophetic example, furfuryl alcohol may be added, dropwise, to an excess of thionyl chloride at 0° C. The reaction mixture may be warmed to ambient temperature or reflux and stirred until completion as indicated by TLC. The excess thionyl chloride may be removed in vacuo and the crude product may be used in the next step without further purification. To a stirred suspension of activated magnesium turnings in diethyl ether 2-chloromethylfuran may be added dropwise at 0° C. Upon completion of the addition, the reaction mixture may be heated to reflux for 1 hour. The reaction mixture is then cooled to room temperature and may be added via cannula to a stirred solution of phosphonic acid diethyl ester at 0° C. The reaction mixture may be warmed to room temperature and stirred until completion, poured into water, and extracted with diethyl ether. The combined organic fractions may be dried over $MgSO_4$, filtered, and the solvents removed in vacuo. The product may be purified by distillation or recrystallization. The phosphine oxide product may be added to a suspension of PhIO in an organic solvent that may include THF or toluene. The reaction mixture may be stirred for 20 minutes to 12 hours at reflux. The reaction mixture may then be diluted with ether and extracted of 5% $NaHCO_3$ water solution. The organic layer may be dried over $MgSO_4$, evaporated and separated by chromatography. The water layer may be acidified with conc. HCl and extracted with ether. The combined ether solutions may be dried over $MgSO_4$, filtered and evaporated to yield the product. The bis(methyl)furan phosphine oxide may be added, dropwise, to an excess of thionyl chloride (or oxalyl chloride, or isocyanuric chloride) at 0° C. The reaction mixture may be warmed to ambient temperature or reflux and stirred until completion as indicated by TLC. The excess thionyl chloride may be removed in vacuo and the crude product may be purified by fractional distillation.

FIG. 14B illustrates a second example of a process of forming the bisfuran-functionalized phosphine oxide molecule. In the first chemical reaction depicted in FIG. 14B, furfuryl alcohol is chemically reacted with thionyl chloride to form 2-(chloromethyl)furan, and the chemical reaction may be performed from 0° C. to room temperature. Alternatively, bromomethylfuran can be synthesized from commercially available reagents and can be used similarly to chloromethylfuran. In the second chemical reaction depicted in FIG. 14B, the 2-(chloromethyl)furan product formed from the furfuryl alcohol may be used to form a phosphinic ester intermediate material. The third chemical reaction of FIG. 14B illustrates that the phosphinic ester intermediate material is reacted with phosphorus pentachloride ($PCl_5$), resulting in the fourth phosphorus-based FR molecule.

As a prophetic example, to a stirred suspension of activated magnesium turnings in diethyl ether 2-chloromethylfuran (synthesized as described previously) may be added dropwise at 0° C. Upon completion of the addition, the reaction mixture may be heated to reflux for 1 hour. The reaction mixture is then cooled to room temperature and may be added via cannula to a stirred solution of phosphonic acid diethyl ester at 0° C. The reaction mixture may be warmed to room temperature and stirred until completion, poured into water, and extracted with diethyl ether. The combined organic fractions may be dried over $MgSO_4$, filtered, and the solvents removed in vacuo. The product may be purified by distillation or recrystallization. The phosphinic acid product may be stirred with a suspension of potassium carbonate in an organic solvent such as DMF or THF and heated to a temperature that may be between 60-100° C. Methyl iodide and 18-crown-6 may be added dropwise to the reaction mixture, and may be stirred until completion. The reaction mixture may be poured into water, and extracted with diethyl ether. The combined organic fractions may be dried over $MgSO_4$, filtered, and the solvents removed in vacuo. The product may be purified by distillation or recrystallization. To a solution of the product from the previous step in $CCl_4$ may be added $PCl_5$ (excess) at 0° C. under an inert atmosphere. The mixture may be allowed to warm up to room temperature and may be stirred for an additional day. The solvent is removed in vacuo and the residue may be distilled to give the product.

Thus, FIGS. 14A and 14B illustrate alternative processes of forming a furan-containing flame retardant molecule from renewable furfuryl alcohol. In the examples of FIGS. 14A and 14B, furfuryl alcohol is used to form a furan-containing FR molecule having two furan moieties bonded to a phosphorus moiety via two phosphinyl linkages. As described further herein, the phosphorus moiety includes a chloride group for bonding (e.g., via chemical reaction with a hydroxyl group), and the two furan moieties provide two potential locations for Diels-Alder reactions with dieonophile group(s) of another material.

Figure 15A:
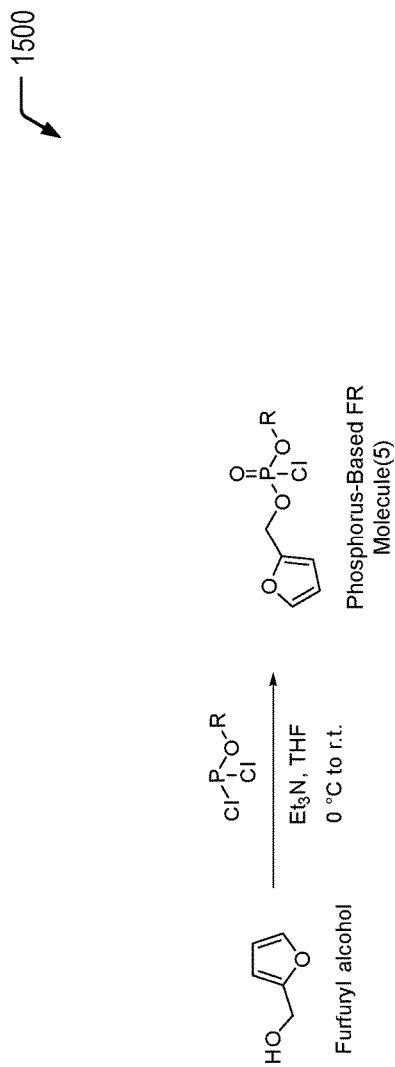
FIGS. 15A and 15B are chemical reaction diagrams showing alternative embodiments of processes of forming a fifth phosphorus-based FR molecule for forming a FR-functionalized caprolactone molecule.
Figure 15B:
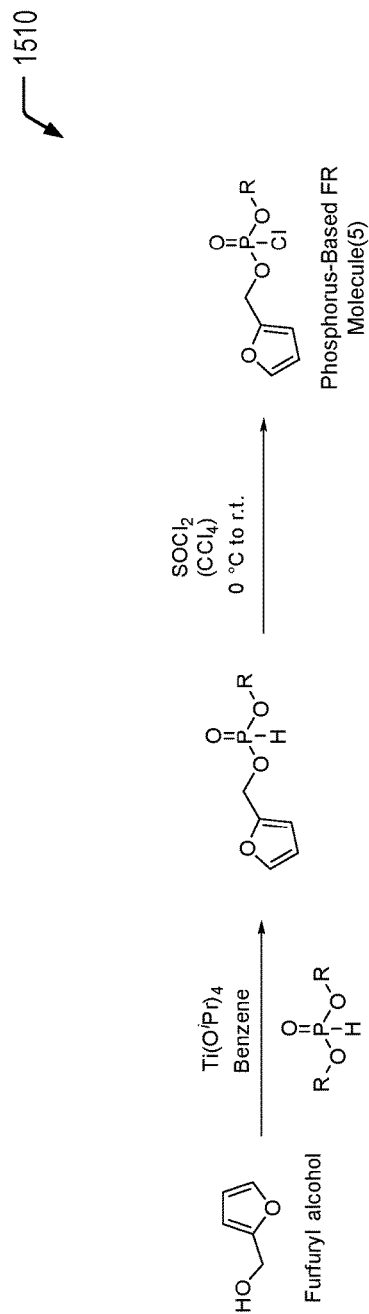

FIGS. 15A and 15B are chemical reaction diagrams showing alternative embodiments of processes of forming a fifth phosphorus-based FR molecule. Referring to FIG. 15A, a first chemical reaction diagram 1500 illustrates a first embodiment of a process of forming the fifth phosphorus-based FR molecule. Referring to FIG. 15B, a second chemical reaction diagram 1510 illustrates an alternative embodiment of a process of forming the fifth phosphorus-based FR molecule.

FIG. 15A illustrates a first example of a process of forming a monofuran-functionalized phosphonate molecule. FIG. 15A illustrates a one-step process via reaction of furfuryl alcohol with dichlorophosphate via careful addition and stoichiometric control. The alkyl (R) groups may include ethyl groups, methyl groups, propyl groups, isopropyl groups, or phenyl groups, among other alternatives. The one-step process may utilize triethylamine ($Et_3N$) and a suitable solvent, such as tetrahydrofuran (THF), and the chemical reaction may be performed from 0° C. to room temperature. FIG. 15A illustrates that the resulting molecule is functionalized with one furan moiety for cross-linking and one chloride for further bonding.

As a prophetic example, to a stirred solution that may include furfuryl alcohol (1.0 eq.) and triethylamine (2.0 eq.) in anhydrous THF, phenyl dichlorophosphate (1.3 eq.) may be added dropwise at 0° C., and the reaction mixture may be stirred at ambient temperature for 2 hours or it may be heated up to reflux (60-65° C.) for an extended reaction time (4 hours). The reaction mixture may be cooled to ambient temperature and filtered to remove the triethylamine hydrochloride salt. The solvents of the filtrate may be removed in vacuo and the product may be purified by fractional distillation.

FIG. 15B illustrates a second example of a process of forming the monofuran-functionalized phosphate molecule. FIG. 15B illustrates an alternative in which furfuryl alcohol can be reacted with titanium (IV) isopropoxide and phophonic acid dialkylester or diphenylester as a pseudotransesterification. The R groups may include ethyl groups, methyl groups, propyl groups, isopropyl groups, or phenyl groups, among other alternatives. The resulting molecule may be reacted with thionyl chloride to give a furan-containing FR molecule with one furan moiety for cross-linking and one chloride for further bonding. In the first chemical reaction, titanium (IV) isopropoxide may be dissolved in a suitable solvent, such as benzene. In the second chemical reaction, thionyl chloride may be dissolved in a suitable solvent, such as carbon tetrachloride ($CCl_4$), and the chemical reaction may be performed from 0° C. to room temperature.

As a prophetic example, dialkyl or diaryl phosphite 1 (5.5 mmol) may be added to the solution of the titanium (IV) isopropoxide (11 mmol) in furfuryl alcohol (excess). This solution may be diluted with benzene. The reaction mixture may be heated 40° C. until completion. The mixture may be poured into water, extracted with $CH_2Cl_2$ (3x), dried over $MgSO_4$, and solvent and volatile components may be removed in vacuo. The products may be purified by fractional distillation or recrystallization. The product from the first step (1.0 eq.), in dry acetonitrile (MeCN), toluene, or dichloromethane (DCM), may be added to a solution of trichloroisocyanuric acid (0.33 eq.), N-chlorosuccinimide (1.0 eq.), or tert-butyl hypochlorite (1.0 eq.) in the same solvent at room temperature, under an $N_2$ atmosphere. Upon the formation of a precipitate, the reaction may be stirred at room temperature for an additional 2 hours. Upon completion of the reaction, as determined by $^{31}P$ NMR, the reaction mixture may be passed through a 0.45 μm Whatman syringe filter and concentrated under vacuum.

Thus, FIGS. 15A and 15B illustrate examples of alternative processes of forming the fifth phosphorus-based FR molecule. In the examples of FIGS. 15A and 15B, furfuryl alcohol is used to form a furan-containing FR molecule having a single furan moiety bonded to a phosphorus moiety via a phosphoryl linkage. As described further herein, the phosphorus moiety includes a chloride group for bonding (e.g., via chemical reaction with a hydroxyl group), and the single furan moiety provides one potential location for a Diels-Alder reaction with a dienophile group of another material.

Figure 16A:
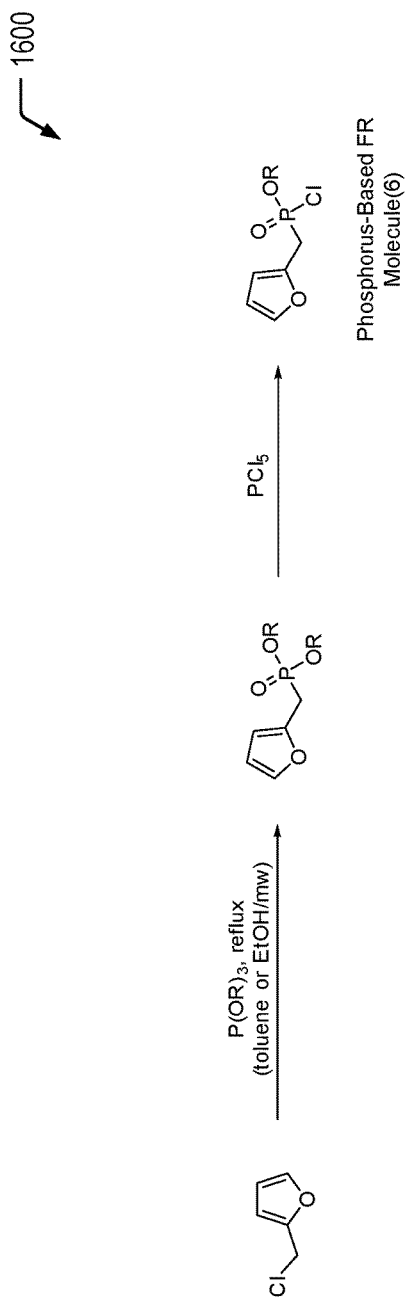
FIGS. 16A and 16B are chemical reaction diagrams showing alternative embodiments of processes of forming a sixth phosphorus-based FR molecule for forming a FR-functionalized caprolactone molecule.
Figure 16B:
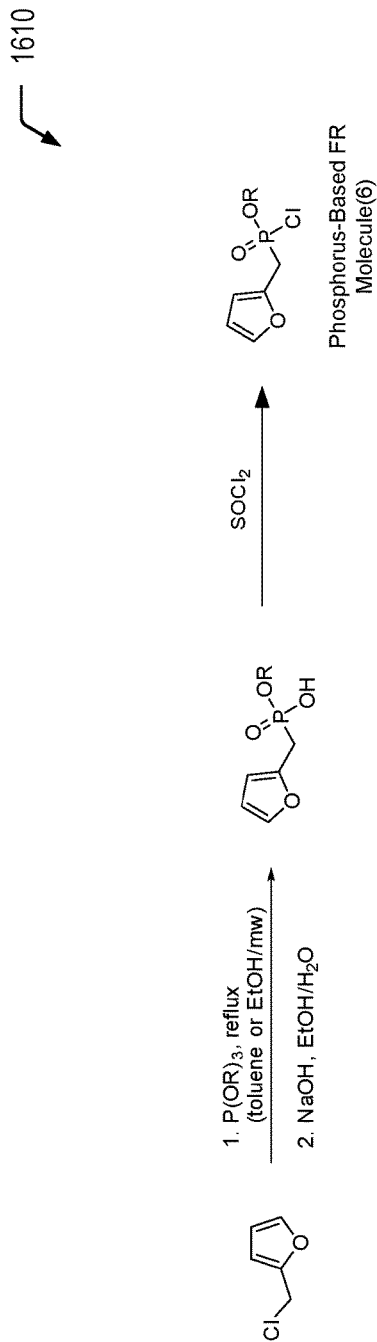

FIGS. 16A and 16B are chemical reaction diagrams showing alternative embodiments of processes of forming a sixth phosphorus-based FR molecule. Referring to FIG. 16A, a first chemical reaction diagram 1600 illustrates a first embodiment of a process of forming the sixth phosphorus-based FR molecule. Referring to FIG. 16B, a second chemical reaction diagram 1610 illustrates an alternative embodiment of a process of forming the sixth phosphorus-based FR molecule.

FIG. 16A illustrates a first example of a process of forming the single phosphonate-linked furan phosphoryl chloride, methylenefuran-phosphonyl chloride. In the first chemical reaction depicted in FIG. 16A, 2-(chloromethyl) furan (which may be synthesized as described herein with respect to the fourth phosphorus-based FR molecule of FIGS. 14A and 14B) is chemically reacted with a trialkylphosphite or a triphenylphosphite to form a phosphonyl ester. R groups may include ethyl groups, methyl groups, propyl groups, isopropyl groups, or phenyl groups, among other alternatives. In the second chemical reaction depicted in FIG. 16A, the phosphonyl ester is reacted with phosphorus pentachloride to form the sixth phosphorus-based FR molecule.

As a prophetic example, 2-(chloromethyl)furan (1 eq.) and trialkyl phosphite may be added to a reaction vessel, which may include an organic solvent such as toluene, THF, ethanol, or DMF, and may also contain a compound such an alumina. The reaction may be heated to reflux or up to 180° C. if done using neat conditions. The reaction mixture may also be irradiated by microwaves for a short period to increase the reaction rate. The reaction may be cooled to room temperature and the excess trialkyl phosphite may be removed in vacuo or it may be washed with DCM, and dried for $CaCl_2$ prior to filtration and having the solvents removed in vacuo. The phosphonate may be purified by fractional distillation. To a solution of the phosphonate product $PCl_5$ (excess) may be added at 0° C. under an inert atmosphere. The reaction may be performed in a solvent such as $CCl_4$. The mixture may be allowed to warm up to room temperature and may be stirred for an additional day. The solvent is then removed in vacuo and the residue may be distilled to give the product.

FIG. 16B illustrates a second example of a process of forming the single phosphonate-linked furan phosphoryl chloride, methylenefuran-phosphonyl chloride. In the first chemical reaction depicted in FIG. 16B, 2-(chloromethyl) furan (synthesized as described herein with respect to FR7) is reacted with a trialkylphosphite or a triphenylphosphite and quenched under aqueous basic conditions to form an alternative intermediate material. R groups may include ethyl groups, methyl groups, propyl groups, isopropyl groups, or phenyl groups, among other alternatives. The second chemical reaction of FIG. 16B illustrates that the intermediate material is then reacted with thionyl chloride to form the sixth phosphorus-based FR molecule.

As a prophetic example, a methylfuryl phosphonate may be generated in a manner similar to that of the phosphonate intermediate used to synthesize the fourth furan-containing FR molecule. Dialkyl benzylphosphonate (1.0 eq.) may be quickly added to a solution of bromodimethyl borane (1.0 eq.) in an organic solvent that may be toluene. The reaction mixture may be warmed to room temperature and stirred overnight. The solvent and volatile byproducts may be removed in vacuo and give a slightly yellow viscous oil. To a solution of the phosphonic acid product $SOCl_2$ (excess) may be added at 0° C. The mixture may be allowed to warm up to room temperature, or heated to 40° C. and may be stirred for an additional day. The solvent is then removed in vacuo and the residue may be distilled to give the product.

Thus, FIGS. 16A and 16B illustrate alternative processes of forming a furan-containing FR molecule from renewable furfuryl alcohol. In the examples of FIGS. 16A and 16B, furfuryl alcohol is used to form a furan-containing FR molecule having a single furan moiety bonded to a phosphorus moiety via a phosphinyl linkage. As described further herein, the phosphorus moiety includes a chloride group for bonding (e.g., via chemical reaction with a hydroxyl group), and the single furan moiety provides one potential location for a Diels-Alder reaction with a dienophile group of another material.

Figure 17:
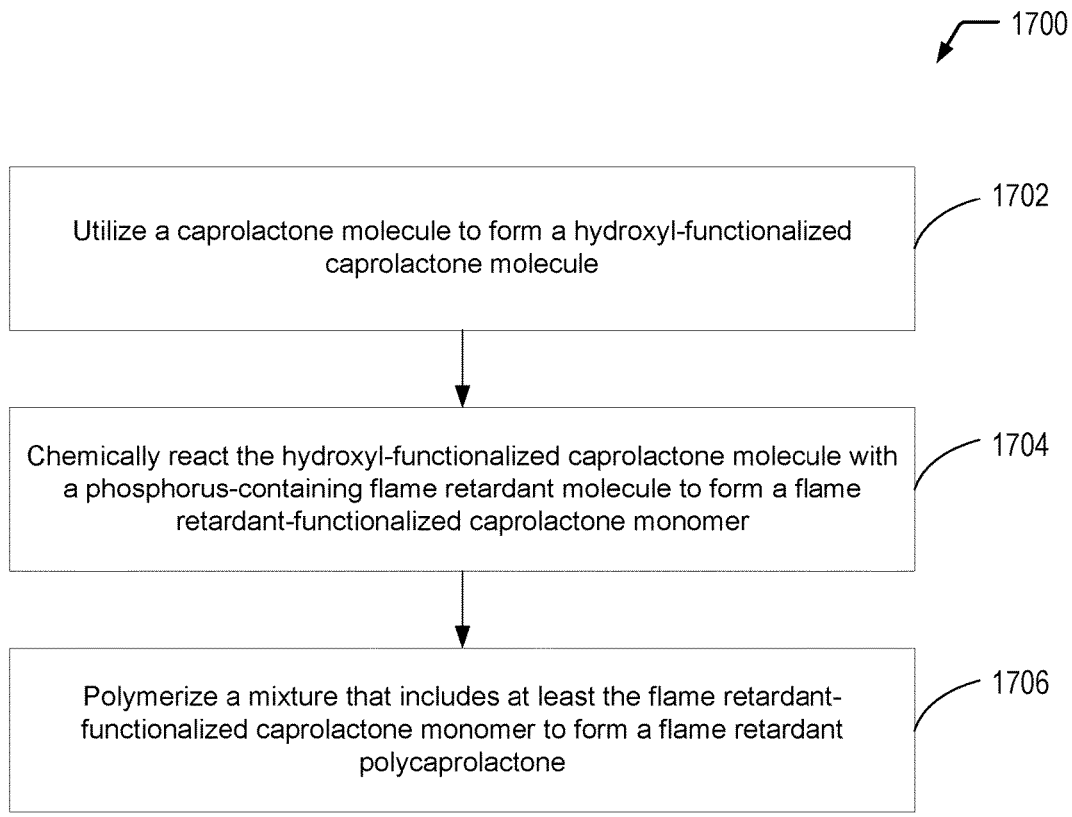
FIG. 17 is a flow diagram showing a particular embodiment of a process of forming a flame retardant polycaprolactone.

Referring to FIG. 17, a flow diagram 1700 illustrates an example of a process of forming a flame retardant polycaprolactone. In the example of FIG. 17, a hydroxyl-functionalized caprolactone molecule is chemically reacted with a phosphorus-containing flame retardant molecule to form a flame retardant-functionalized caprolactone monomer. In some cases, the flame retardant polycaprolactone is formed by polymerizing the flame retardant-functionalized caprolactone monomer. In other cases, a mixture of the flame retardant-functionalized caprolactone monomer and an unfunctionalized caprolactone monomer may be polymerized to form a flame retardant polycaprolactone copolymer. It will be appreciated that the operations shown in FIG. 17 are for illustrative purposes only and that the operations may be performed in alternative orders, at alternative times, by a single entity or by multiple entities, or a combination thereof. For example, one entity may form the phosphorus-containing flame retardant molecule, another entity may form the hydroxyl-functionalized caprolactone molecule, while yet another entity may form the flame retardant-functionalized caprolactone monomer. Additionally, in some cases, another entity may form the flame retardant polycaprolactone.

The process 1700 includes utilizing a caprolactone molecule to form a hydroxyl-functionalized caprolactone molecule, at 1702. For example, the hydroxyl-functionalized caprolactone molecule may be formed from a caprolactone molecule according to processes previously described herein with respect to FIGS. 1, 2, 5, and 6. In the example depicted in FIG. 1, the hydroxyl-functionalized caprolactone molecule includes two hydroxyl groups. In the example depicted in FIG. 2, the hydroxyl-functionalized caprolactone molecule includes four hydroxyl groups. In the example depicted in FIG. 5, the hydroxyl-functionalized caprolactone molecule includes one hydroxyl group. In the example depicted in FIG. 6, the hydroxyl-functionalized caprolactone molecule includes two hydroxyl groups. In some cases, the reaction conditions may result in a mixture of stereochemistry, in which the hydroxyl-functionalized caprolactone molecule includes both 3,4-hydroxyl-caprolactone and 3,5-hydroxyl-caprolactone, each of which have two hydroxyl groups per molecule.

The process 1700 includes chemically reacting the hydroxyl-functionalized caprolactone molecule with a phosphorus-containing flame retardant molecule to form a flame retardant-functionalized caprolactone molecule, at 1704. For example, the hydroxyl-functionalized caprolactone molecule may be chemically reacted with one of the phosphorus-based flame retardant molecules of the present disclosure, according to processes previously described herein with respect to FIGS. 1, 2, 5, and 6. In some cases, the phosphorus-based flame retardant molecule that is chemically reacted with the hydroxyl-functionalized caprolactone molecule may correspond to the first phosphorus-based flame retardant molecule described herein with respect to FIGS. 9A and 9B. In other cases, the phosphorus-based flame retardant molecule may correspond to the second phosphorus-based flame retardant molecule described herein with respect to FIGS. 11A and 11B. In other cases, the phosphorus-based flame retardant molecule may correspond to the third phosphorus-based flame retardant molecule described herein with respect to FIG. 12. In other cases, the phosphorus-based flame retardant molecule may correspond to the fourth phosphorus-based flame retardant molecule described herein with respect to FIGS. 14A and 14B. In other cases, the phosphorus-based flame retardant molecule may correspond to the fifth phosphorus-based flame retardant molecule described herein with respect to FIGS. 15A and 15B. In other cases, the phosphorus-based flame retardant molecule may correspond to the sixth phosphorus-based flame retardant molecule described herein with respect to FIGS. 16A and 16B.

The process 1700 includes polymerizing a mixture that includes at least the flame retardant-functionalized caprolactone monomer to form a flame retardant polycaprolactone, at 1706. For example, referring to FIG. 1, the first flame retardant polycaprolactone may be formed from the first flame retardant-functionalized caprolactone monomer. As another example, referring to FIG. 2, the second flame retardant polycaprolactone may be formed from the second flame retardant-functionalized caprolactone monomer. As a further example, referring to FIG. 5, the third flame retardant polycaprolactone may be formed from the third flame retardant-functionalized caprolactone monomer. As yet another example, referring to FIG. 6, the fourth flame retardant polycaprolactone may be formed from the fourth flame retardant-functionalized caprolactone monomer.

In some cases, the mixture may further include an unfunctionalized caprolactone monomer, and the flame retardant polycaprolactone may correspond to a flame retardant polycaprolactone copolymer. For example, referring to FIG. 3, the first flame retardant polycaprolactone copolymer may be formed from a mixture that includes an unfunctionalized caprolactone monomer and the first flame retardant-functionalized caprolactone monomer of FIG. 1. As another example, referring to FIG. 4, the second flame retardant polycaprolactone copolymer may be formed from a mixture that includes an unfunctionalized caprolactone monomer and the second flame retardant-functionalized caprolactone monomer of FIG. 2. As a further example, referring to FIG. 7, the third flame retardant polycaprolactone copolymer may be formed from a mixture that includes an unfunctionalized caprolactone monomer and the third flame retardant-functionalized caprolactone monomer of FIG. 5. As yet another example, referring to FIG. 8, the fourth flame retardant polycaprolactone copolymer may be formed from a mixture that includes an unfunctionalized caprolactone monomer and the fourth flame retardant-functionalized caprolactone monomer of FIG. 6.

Thus, FIG. 17 illustrates an example of a process of forming a flame retardant polycaprolactone. In the example of FIG. 17, a hydroxyl-functionalized caprolactone molecule is chemically reacted with a phosphorus-containing flame retardant molecule to form a flame retardant-functionalized caprolactone monomer. In some cases, the flame retardant polycaprolactone is formed by polymerizing the flame retardant-functionalized caprolactone monomer. In other cases, a mixture of the flame retardant-functionalized caprolactone monomer and an unfunctionalized caprolactone monomer may be polymerized to form a flame retardant polycaprolactone copolymer.

Figure 18:
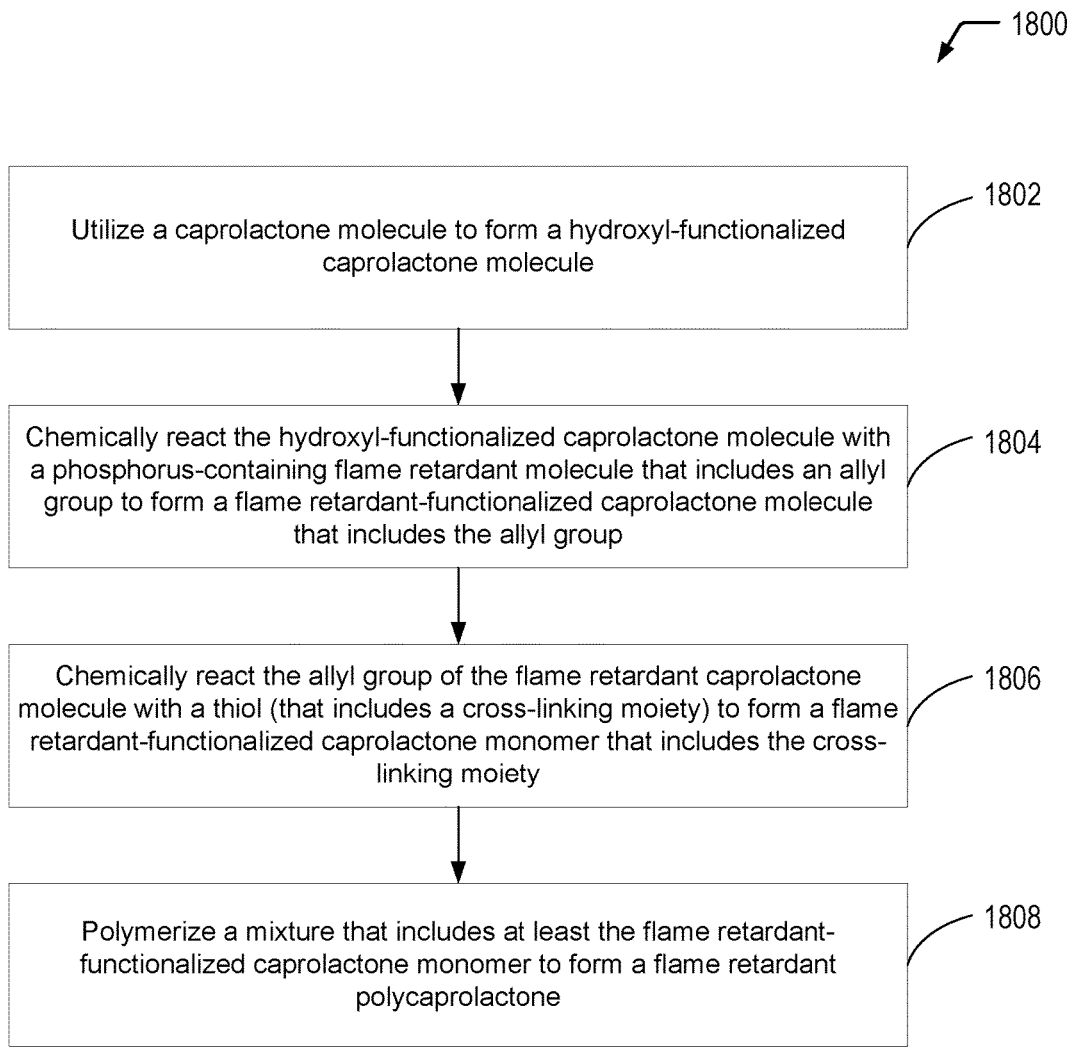
FIG. 18 is a flow diagram showing a particular embodiment of a process of forming a flame retardant polycaprolactone.

Referring to FIG. 18, a flow diagram 1800 illustrates an example of a process of forming a flame retardant polycaprolactone. In the example of FIG. 18, a hydroxyl-functionalized caprolactone molecule is chemically reacted with a phosphorus-containing flame retardant molecule (that includes an allyl group) to form a flame retardant-functionalized caprolactone monomer (that includes the allyl group). Subsequently, the flame retardant-functionalized caprolactone monomer (that includes the allyl group) is chemically reacted with a thiol (that includes a cross-linking moiety) to form an FR-functionalized caprolactone monomer (that includes the cross-linking moiety). In some cases, the flame retardant polycaprolactone is formed by polymerizing the flame retardant-functionalized caprolactone monomer (that includes the cross-linking moiety). In other cases, a mixture of the flame retardant-functionalized caprolactone monomer (that includes the cross-linking moiety) and an unfunctionalized caprolactone monomer may be polymerized to form a flame retardant polycaprolactone copolymer. It will be appreciated that the operations shown in FIG. 18 are for illustrative purposes only and that the operations may be performed in alternative orders, at alternative times, by a single entity or by multiple entities, or a combination thereof.

The process 1800 includes utilizing a caprolactone molecule to form a hydroxyl-functionalized caprolactone molecule, at 1802. For example, the hydroxyl-functionalized caprolactone molecule may be formed from a caprolactone molecule according to processes previously described herein with respect to FIGS. 1, 2, 5, and 6.

The process 1800 includes chemically reacting the hydroxyl-functionalized caprolactone molecule with a phosphorus-containing flame retardant molecule that includes an allyl group to form a flame retardant-functionalized caprolactone molecule that includes the allyl group, at 1804. For example, referring to FIGS. 9A and 9B, when the alcohol (ROH) is allyl alcohol, the first phosphorus-based flame retardant molecule includes an allyl group. In this case, referring to FIG. 10, the allyl group of the first phosphorus-based flame retardant molecule of FIGS. 9A and 9B may be chemically reacted with one of the FR-functionalized caprolactone molecules formed according to processes previously described herein with respect to FIGS. 1, 2, 5, and 6. FIG. 10 illustrates that the resulting FR-functionalized caprolactone molecule includes the allyl group. As another example, referring to FIGS. 11A and 11B, when the chloride (RCl) is allyl chloride, the second phosphorus-based flame retardant molecule includes an allyl group. In this case, referring to FIG. 12, the allyl group of the second phosphorus-based flame retardant molecule of FIGS. 11A and 11B may be chemically reacted with one of the FR-functionalized caprolactone molecules formed according to processes previously described herein with respect to FIGS. 1, 2, 5, and 6. FIG. 12 illustrates that the resulting FR-functionalized caprolactone molecule includes the allyl group.

The process 1800 includes chemically reacting the allyl group of the flame retardant caprolactone molecule with a thiol (that includes a cross-linking moiety) to form a flame retardant-functionalized caprolactone monomer that includes the cross-linking moiety (1806). For example, referring to FIG. 10, the FR-functionalized caprolactone molecule that includes the allyl group may be chemically reacted with a thiol (that includes a hydroxyl group, an amine group, a carboxyl group, or an ester group) via thiol-ene "Click" chemistry to form the FR-functionalized caprolactone molecule with cross-linker(s). As another example, referring to FIG. 12, the FR-functionalized caprolactone molecule that includes the allyl group may be chemically reacted with a thiol (that includes a hydroxyl group, an amine group, a carboxyl group, or an ester group) via thiol-ene "Click" chemistry to form the FR-functionalized caprolactone molecule with cross-linker(s).

The process 1800 further includes polymerizing a mixture that includes at least the flame retardant-functionalized caprolactone monomer to form a flame retardant polycaprolactone, at 1808. For example, referring to FIG. 1, the first flame retardant polycaprolactone may be formed from the first flame retardant-functionalized caprolactone monomer (that corresponds to the FR-functionalized caprolactone molecule depicted in FIG. 10 or FIG. 12). As another example, referring to FIG. 2, the second flame retardant polycaprolactone may be formed from the second flame retardant-functionalized caprolactone monomer (that corresponds to the FR-functionalized caprolactone molecule depicted in FIG. 10 or FIG. 12). As a further example, referring to FIG. 5, the third flame retardant polycaprolactone may be formed from the third flame retardant-functionalized caprolactone monomer (that corresponds to the FR-functionalized caprolactone molecule depicted in FIG. 10 or FIG. 12). As yet another example, referring to FIG. 6, the fourth flame retardant polycaprolactone may be formed from the fourth flame retardant-functionalized caprolactone monomer (that corresponds to the FR-functionalized caprolactone molecule depicted in FIG. 10 or FIG. 12).

In some cases, the mixture may further include an unfunctionalized caprolactone monomer, and the flame retardant polycaprolactone may correspond to a flame retardant polycaprolactone copolymer. For example, referring to FIG. 3, the first flame retardant polycaprolactone copolymer may be formed from a mixture that includes an unfunctionalized caprolactone monomer and the first flame retardant-functionalized caprolactone monomer of FIG. 1 (that corresponds to the FR-functionalized caprolactone molecule depicted in FIG. 10 or FIG. 12). As another example, referring to FIG. 4, the second flame retardant polycaprolactone copolymer may be formed from a mixture that includes an unfunctionalized caprolactone monomer and the second flame retardant-functionalized caprolactone monomer of FIG. 2 (that corresponds to the FR-functionalized caprolactone molecule depicted in FIG. 10 or FIG. 12). As a further example, referring to FIG. 7, the third flame retardant polycaprolactone copolymer may be formed from a mixture that includes an unfunctionalized caprolactone monomer and the third flame retardant-functionalized caprolactone monomer of FIG. 5 (that corresponds to the FR-functionalized caprolactone molecule depicted in FIG. 10 or FIG. 12). As yet another example, referring to FIG. 8, the fourth flame retardant polycaprolactone copolymer may be formed from a mixture that includes an unfunctionalized caprolactone monomer and the fourth flame retardant-functionalized caprolactone monomer of FIG. 6 (that corresponds to the FR-functionalized caprolactone molecule depicted in FIG. 10 or FIG. 12).

Thus, FIG. 18 illustrates an example of a process of forming a flame retardant polycaprolactone. In the example of FIG. 18, In the example of FIG. 18, a hydroxyl-functionalized caprolactone molecule is chemically reacted with a phosphorus-containing flame retardant molecule (that includes an allyl group) to form a flame retardant-functionalized caprolactone monomer (that includes the allyl group). Subsequently, the flame retardant-functionalized caprolactone monomer (that includes the allyl group) is chemically reacted with a thiol (that includes a cross-linking moiety) to form an FR-functionalized caprolactone monomer (that includes the cross-linking moiety). In some cases, the flame retardant polycaprolactone is formed by polymerizing the flame retardant-functionalized caprolactone monomer. In other cases, a mixture of the flame retardant-functionalized caprolactone monomer and an unfunctionalized caprolactone monomer may be polymerized to form a flame retardant polycaprolactone copolymer.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A process of forming a flame retardant polycaprolactone, the process comprising:
    utilizing a caprolactone molecule to form a hydroxyl-functionalized caprolactone molecule;
    chemically reacting the hydroxyl-functionalized caprolactone molecule with a phosphorus-containing flame retardant molecule to form a flame retardant-functionalized caprolactone monomer; and
    polymerizing a mixture that includes at least the flame retardant-functionalized caprolactone monomer to form a flame retardant polycaprolactone.

2. The process of claim 1, wherein the mixture further includes an unfunctionalized caprolactone monomer, and wherein the flame retardant polycaprolactone includes a flame retardant polycaprolactone copolymer.

3. The process of claim 1, wherein the phosphorus-containing flame retardant molecule includes a cross-linking moiety to cross-link the flame retardant polycaprolactone into a second polymeric material.

4. The process of claim 3, wherein the cross-linking moiety includes an allyl group, an epoxide group, or a furan group.

5. The process of claim 3, wherein the cross-linking moiety includes an allyl group, and wherein the phosphorus-containing flame retardant molecule is formed from allylic alcohol.

6. The process of claim 3, wherein the cross-linking moiety includes an epoxide group, and wherein the phosphorus-containing flame retardant molecule is formed from glycidol.

7. The process of claim 3, wherein the cross-linking moiety includes a furan group, and wherein the phosphorus-containing flame retardant molecule is formed from furfuryl alcohol.

8. The process of claim 3, wherein the cross-linking moiety includes a furan group, and wherein the phosphorus-containing flame retardant molecule is formed from 2-(chloromethyl)furan.

9. A process of forming a flame retardant polycaprolactone, the process comprising:
    utilizing a caprolactone molecule to form a hydroxyl-functionalized caprolactone molecule;
    chemically reacting the hydroxyl-functionalized caprolactone molecule with a phosphorus-containing flame retardant molecule that includes an allyl group to form a flame retardant-functionalized caprolactone molecule that includes the allyl group;
    chemically reacting the allyl group of the flame retardant-functionalized caprolactone molecule with a thiol that includes a cross-linking moiety to form a flame retardant-functionalized caprolactone monomer that includes the cross-linking moiety; and
    polymerizing a mixture that includes at least the flame retardant-functionalized caprolactone monomer to form a flame retardant polycaprolactone.

10. The process of claim 9, wherein the cross-linking moiety includes a hydroxyl group, an amine group, a carboxyl group, or an ester group to cross-link the flame retardant polycaprolactone into a second polymeric material.

11. The process of claim 10, further comprising chemically reacting the flame retardant polycaprolactone and the second polymeric material to form a cross-linked flame retardant polymeric material.

12. The process of claim 9, wherein the phosphorus-containing flame retardant molecule includes a phosphate molecule that includes the allyl group and a chloride group to chemically react with a hydroxyl group of the hydroxyl-functionalized caprolactone molecule.

13. The process of claim 9, wherein the phosphorus-containing flame retardant molecule includes a phosphonate molecule that includes the allyl group and a chloride group to chemically react with a hydroxyl group of the hydroxyl-functionalized caprolactone molecule.

14. The process of claim 9, wherein the mixture further includes an unfunctionalized caprolactone monomer, and wherein the flame retardant polycaprolactone includes a flame retardant polycaprolactone copolymer.

* * * * *